US 12,434,529 B2

United States Patent
Yamahata et al.

(10) Patent No.: US 12,434,529 B2
(45) Date of Patent: Oct. 7, 2025

(54) VEHICLE CONTROL APPARATUS AND SUSPENSION SYSTEM

(71) Applicant: Hitachi Astemo, Ltd., Hitachinaka (JP)

(72) Inventors: Masatoshi Yamahata, Hitachinaka (JP); Ryusuke Hirao, Hitachinaka (JP); Yuki Yoshida, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 230 days.

(21) Appl. No.: 18/014,253

(22) PCT Filed: Jul. 6, 2021

(86) PCT No.: PCT/JP2021/025422
§ 371 (c)(1),
(2) Date: Jan. 3, 2023

(87) PCT Pub. No.: WO2022/009869
PCT Pub. Date: Jan. 13, 2022

(65) Prior Publication Data
US 2023/0271471 A1    Aug. 31, 2023

(30) Foreign Application Priority Data
Jul. 8, 2020    (JP) ................................ 2020-117710

(51) Int. Cl.
*B60G 17/00* (2006.01)
*B60G 17/0165* (2006.01)
*B60G 17/018* (2006.01)

(52) U.S. Cl.
CPC ..... *B60G 17/0182* (2013.01); *B60G 17/0165* (2013.01); *B60G 2400/0511* (2013.01);
(Continued)

(58) Field of Classification Search
CPC ............ B60G 17/0182; B60G 17/0165; B60G 2400/0511; B60G 2400/0512;
(Continued)

(56) References Cited

U.S. PATENT DOCUMENTS 7,957,877 B2 * 6/2011 Makiyama ........... B60G 17/018
701/72
10,131,386 B2 * 11/2018 Bodin ..................... B60G 17/06
(Continued)

FOREIGN PATENT DOCUMENTS

EP        2042356 A2 *   4/2009   ............ B60G 17/015
JP        2010-083329       4/2010
(Continued)

OTHER PUBLICATIONS

International Search Report issued Sep. 21, 2021 in International Application No. PCT/JP2021/025422, with English translation.
(Continued)

*Primary Examiner* — Jonathan M Dager
(74) *Attorney, Agent, or Firm* — Wenderoth, Lind & Ponack, L.L.P.

(57) ABSTRACT

A controller estimates a state of a vehicle based on a wheel speed sensor provided on the vehicle, and outputs a control signal to a shock absorber provided between a wheel and a vehicle body according to the estimated state of the vehicle. The controller uses information of a sensor of an in-vehicle apparatus other than an apparatus dedicated to the shock absorber as an observed value in the estimation of the state of the vehicle. In other words, the controller uses sensor information of a navigation apparatus corresponding to the in-vehicle apparatus other than the shock absorber, more specifically, gyro information meaning information of a gyro sensor mounted on the navigation apparatus as the observed value in the estimation of the state of the vehicle.

13 Claims, 6 Drawing Sheets

(52) U.S. Cl.
CPC ............. *B60G 2400/0512* (2013.01); *B60G 2400/102* (2013.01); *B60G 2400/208* (2013.01); *B60G 2400/252* (2013.01); *B60G 2400/821* (2013.01); *B60G 2401/28* (2013.01); *B60G 2500/10* (2013.01); *B60G 2600/60* (2013.01)

(58) Field of Classification Search
CPC ........ B60G 2400/102; B60G 2400/208; B60G 2400/252; B60G 2400/821; B60G 2401/28; B60G 2500/10; B60G 2600/60; B60G 2400/05; B60G 17/015; B60Y 2400/86
See application file for complete search history.

(56) References Cited

U.S. PATENT DOCUMENTS

| | | | | |
|---|---|---|---|---|
| 10,926,602 | B2* | 2/2021 | Hirao | B60G 17/06 |
| 11,203,243 | B2* | 12/2021 | Goto | B60G 17/08 |
| 11,318,804 | B2* | 5/2022 | Minakuchi | B60W 40/112 |
| 11,364,762 | B2* | 6/2022 | Hadi | B60G 3/04 |
| 11,993,122 | B1* | 5/2024 | Nunes | G07C 5/0808 |
| 12,002,305 | B1* | 6/2024 | Gross | G06Q 30/0206 |
| 12,162,322 | B2* | 12/2024 | Hirao | B60G 17/06 |
| 2009/0085309 | A1* | 4/2009 | Hirao | B60G 17/015 280/5.503 |
| 2014/0095024 | A1* | 4/2014 | Hirao | B60G 17/08 701/37 |
| 2015/0057839 | A1* | 2/2015 | Chang | B60R 16/0373 701/2 |
| 2016/0121823 | A1* | 5/2016 | Umscheid | F16H 59/0217 701/2 |
| 2016/0234356 | A1* | 8/2016 | Thomas | H04K 3/84 |
| 2018/0173223 | A1* | 6/2018 | Doane | G08G 1/16 |
| 2019/0263210 | A1 | 8/2019 | Nasu et al. | |
| 2019/0270358 | A1* | 9/2019 | Korrect | B60G 17/018 |
| 2019/0276036 | A1* | 9/2019 | Noguchi | B60W 30/18 |
| 2020/0070891 | A1 | 3/2020 | Gunji et al. | |
| 2020/0331317 | A1 | 10/2020 | Nasu et al. | |
| 2021/0309064 | A1* | 10/2021 | Negishi | B60K 35/22 |
| 2021/0331684 | A1* | 10/2021 | Papp | A61B 5/1118 |
| 2022/0161781 | A1* | 5/2022 | Gupta | B60G 17/06 |
| 2022/0281520 | A1* | 9/2022 | Fujimoto | B62D 15/025 |
| 2023/0271469 | A1* | 8/2023 | Birch | B60G 17/016 701/23 |
| 2023/0271470 | A1* | 8/2023 | Kelly | B60G 17/017 701/37 |
| 2023/0294472 | A1* | 9/2023 | Birch | B60G 17/018 701/37 |
| 2023/0294473 | A1* | 9/2023 | Ali | B60G 17/0161 701/37 |
| 2023/0331056 | A1* | 10/2023 | Birch | B60G 17/0164 |
| 2025/0074131 | A1* | 3/2025 | Rutkowski | B60G 17/0185 |

FOREIGN PATENT DOCUMENTS

| | | |
|---|---|---|
| JP | 2019-119380 | 7/2019 |
| WO | 2018/105399 | 6/2018 |
| WO | 2019/077972 | 4/2019 |

OTHER PUBLICATIONS

Written Opinion of the International Searching Authority issued Sep. 21, 2021 in International Application No. PCT/JP2021/025422, with English translation.

* cited by examiner

VEHICLE CONTROL APPARATUS AND SUSPENSION SYSTEM

TECHNICAL FIELD

The present invention relates to a vehicle control apparatus and a suspension system mounted on a vehicle, such as an automobile.

BACKGROUND ART

PTL 1 discusses a vehicle motion state estimation apparatus that estimates a bounce motion state of a vehicle body (in the vertical direction) based on information indicating a wheel speed, a longitudinal acceleration of the vehicle body, a lateral acceleration of the vehicle body, a yaw rate, and a steering angle. This vehicle motion state estimation apparatus estimates the state of the vehicle body based on a component fluctuated due to a vertical motion of the vehicle body that is extracted from the wheel speed.

CITATION LIST

Patent Literature

PTL 1: Japanese Patent Application Public Disclosure No. 2019-119380

SUMMARY OF INVENTION

Technical Problem

According to the above-described patent literature, PTL 1, the state of the vehicle body is estimated based on sensor information acquired from a braking/driving control system and a steering control system of the vehicle. One possible method for estimating the state of the vehicle body in this case is to use a Kalman filter, which is one type of observer. However, in a case where the vehicle motion state estimation apparatus is configured to calculate the state using estimated values for all of the fluctuation component of the vehicle speed due to the vertical motion of the vehicle body, the roll rate, and the pitch rate as observed values of the Kalman filter, a reduction in the accuracy of estimating the observed values may also lead to a reduction in the accuracy of estimating the state of the vehicle body.

One object of one aspect of the present invention is to provide a vehicle control apparatus and a suspension system capable of improving accuracy of estimating a state of a vehicle (a vehicle body).

Solution to Problem

According to one aspect of the present invention, a vehicle control apparatus estimates a state of a vehicle based on a wheel speed sensor mounted on the vehicle and outputs a control signal to a damping force variable shock absorber provided between a wheel and a vehicle body according to the estimated state of the vehicle. The vehicle control apparatus uses information of a sensor of an in-vehicle apparatus other than an apparatus dedicated to the damping force variable shock absorber to estimate the state of the vehicle as an observed value.

Further, according to one aspect of the present invention, a suspension system includes a damping force variable shock absorber provided between a wheel and a vehicle body of a vehicle, a vehicle control apparatus configured to output a control signal to the damping force variable shock absorber, and a wheel speed sensor mounted on the vehicle. The suspension system estimates a state of the vehicle based on wheel speed information of the wheel speed sensor and controls a damping force of the damping force variable shock absorber according to the estimated state of the vehicle. The suspension system uses sensor information of an in-vehicle system other than a system for controlling the vehicle to control the damping force variable shock absorber.

According to the one aspect of the present invention, the accuracy of estimating the state of the vehicle (the vehicle body) can be improved.

DESCRIPTION OF EMBODIMENTS

In the following description, a vehicle control apparatus and a suspension system according to embodiments will be described citing an example in which they are applied to an automobile (more specifically, a four-wheeled automobile) as a vehicle with reference to the accompanying drawings.

Figure 1:
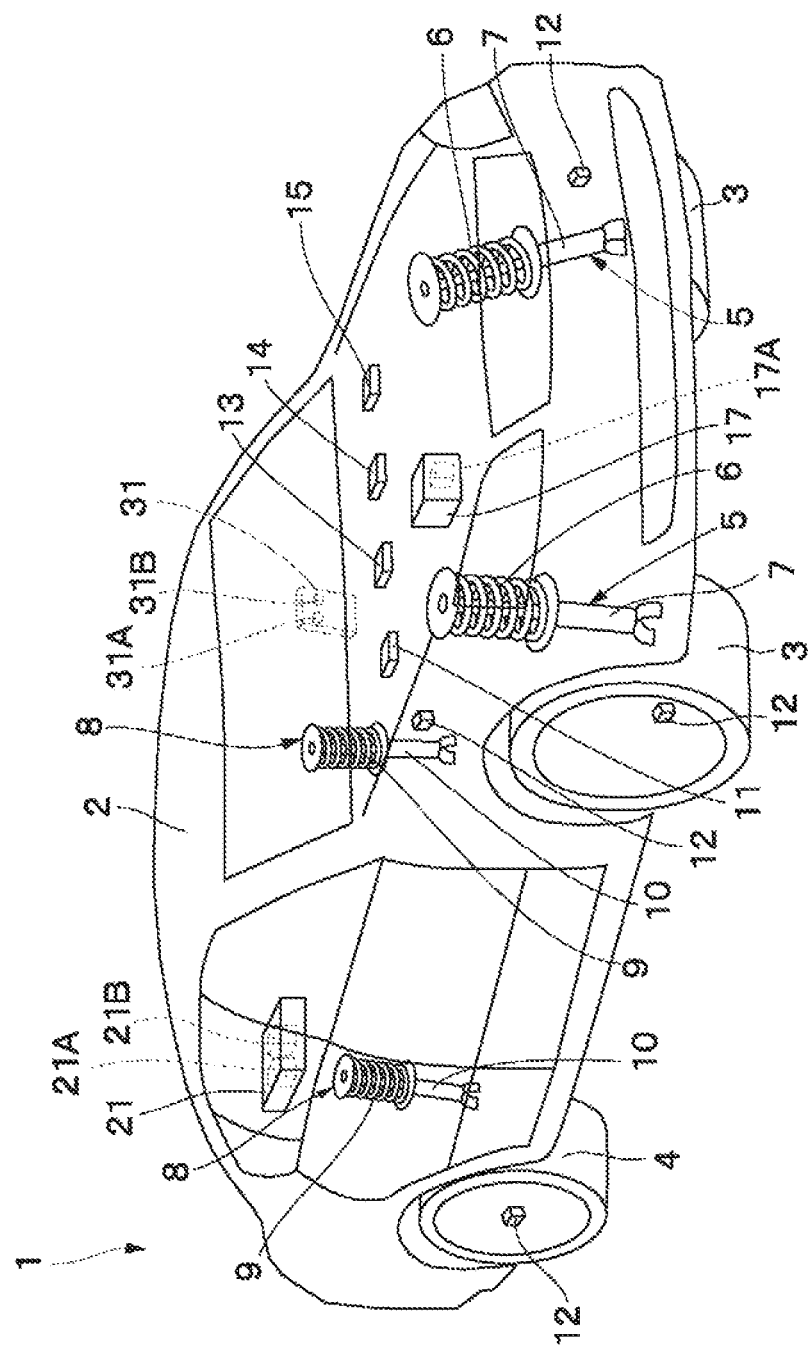
FIG. 1 is an overall configuration diagram illustrating a four-wheeled automobile on which a vehicle control apparatus and a suspension system according to a first embodiment are mounted.
Figure 2:
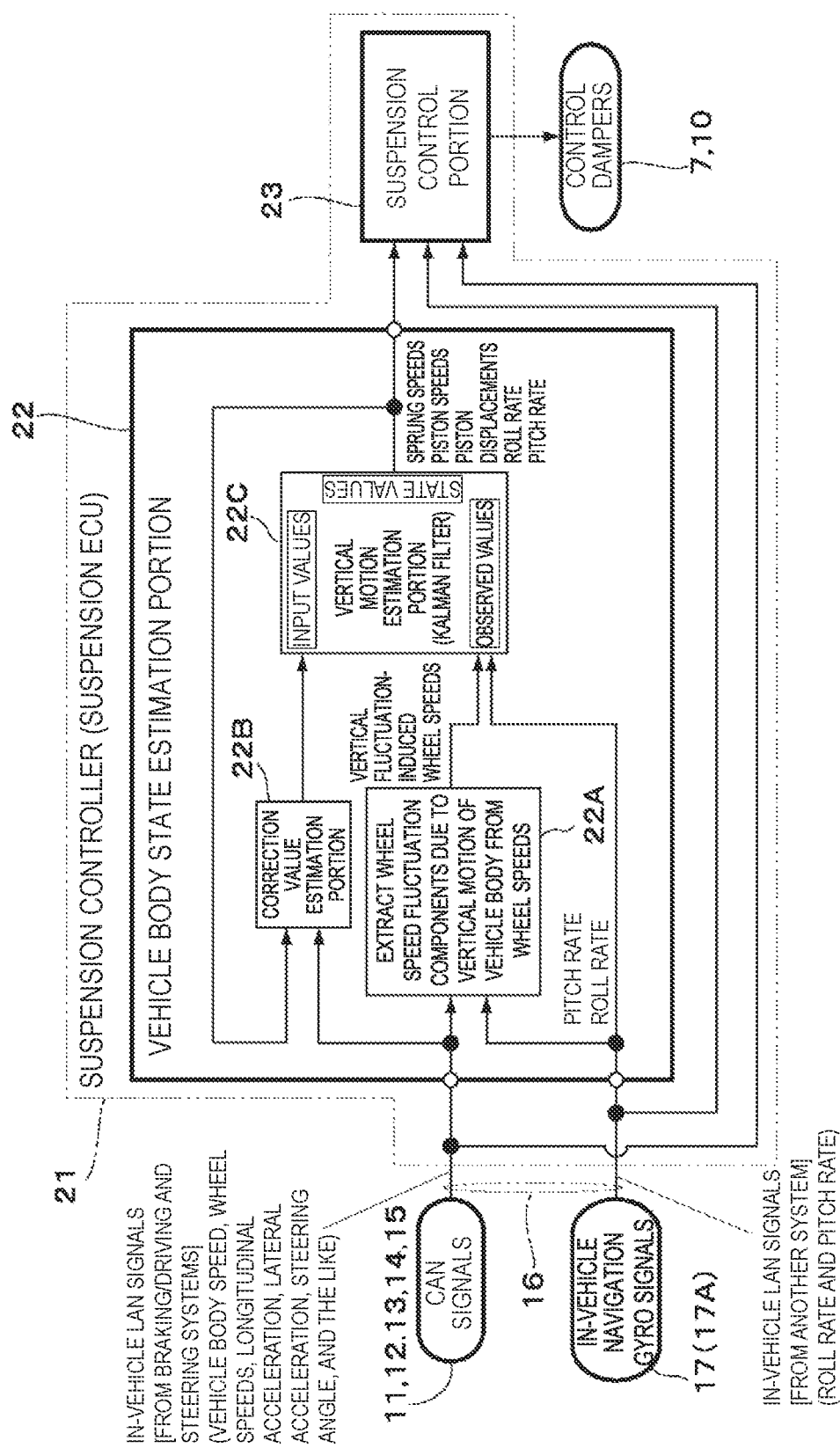
FIG. 2 is a block diagram illustrating a controller (an ECU), damping force variable shock absorbers (control dampers), and the like in FIG. 1.

FIGS. 1 and 2 illustrate a first embodiment. In FIG. 1, four wheels 3 and 4 in total that include, for example, left and right front wheels 3 and left and right rear wheels 4 (only one of them is illustrated) are disposed under a vehicle body 2 forming a main structure of a vehicle 1, which is an automobile. Front wheel-side suspensions 5 and 5 (hereinafter referred to as front wheel suspensions 5) are disposed so as to be interposed between the left and right front wheels 3 and the vehicle body 2, respectively. The front wheel suspensions 5 each include a suspension spring 6 (hereinafter referred to as a spring 6) and a damping force adjustable shock absorber 7 (hereinafter referred to as a shock absorber 7) arranged in parallel with the spring 6.

Rear wheel-side suspensions 8 and 8 (hereinafter referred to as rear wheel suspensions 8) are disposed so as to be interposed between the left and right rear wheels 4 and the vehicle body 2, respectively. The rear wheel suspensions 8 each include a suspension spring 9 (hereinafter referred to as a spring 9) and a damping force adjustable shock absorber 10 (hereinafter referred to as a shock absorber 10) arranged in parallel with the spring 9. The shock absorbers 7 and 10 are each formed by, for example, a semi-active damper realized by a hydraulic cylinder apparatus capable of adjusting a damping force (a damping force variable shock absorber). In other words, the vehicle 1 is equipped with a semi-active suspension system using the damping force variable shock absorber.

Now, the shock absorbers 7 and 10 are damping force-variable damping force generation apparatuses (damping force variable shock absorbers) provided between the vehicle body 2 and the wheels 3 and 4 of the vehicle 1. The shock absorbers 7 and 10 correspond to a vehicle body posture controller that controls the posture of the vehicle 1. More specifically, the characteristics of the damping forces generated by the shock absorbers 7 and 10 (the damping force characteristics) are variably controlled by a controller 21, which will be described below. To achieve that, the shock absorbers 7 and 10 are each equipped with an actuator (not illustrated) realized by a damping force adjustment valve and a solenoid or the like to adjust the damping force characteristic from a hard characteristic (a high characteristic) to a soft characteristic (a low characteristic) continuously (or in a multi-step manner). The damping force characteristics of the shock absorbers 7 and 10 are each variably adjusted according to an instruction current (a control signal) supplied from the controller 21 to the actuator.

A conventionally known structure, such as a pressure control method that controls a pilot pressure of a damping force generation valve and a flow rate control method that controls a passage area, can be used as the damping force adjustment valve. Alternatively, each of the shock absorbers 7 and 10 is not limited to the above-described example as long as it can adjust the damping force continuously (or in a multi-step manner), and may be, for example, a pneumatic damper, an electromagnetic damper, an electrorheological fluid damper, or a magnetic fluid damper. Alternatively, each of the shock absorbers 7 and 10 may be, for example, an air damper (an air suspension) using an air spring (a pneumatic spring), a hydraulic damper (a vehicle height adjustment apparatus) in which front left and right and rear left and right hydraulic cylinders are connected via pipes, or a stabilizer that provides a force to motions of the left and right wheels. Further, each of the shock absorbers 7 and 10 may be a full-active damper formed by a hydraulic actuator, an electric actuator, or an atmospheric actuator capable of generating a thrust force. In other words, a full-active suspension system using a full-active damper may be mounted on the vehicle 1.

Next, various kinds of sensors 11, 12, 13, 14, and 15 that detect the state of the vehicle 1 will be described.

As illustrated in FIG. 1, the vehicle 1 includes a vehicle speed sensor 11, wheel speed sensors 12, a longitudinal acceleration sensor 13, a lateral acceleration sensor 14, and a steering angle sensor 15. These sensors 11, 12, 13, 14, and 15 are each a sensor generally mounted on the vehicle 1, more specifically, a sensor mainly used to control braking, driving, and steering of the vehicle 1.

The vehicle speed sensor 11 is disposed on, for example, an output shaft (not illustrated) of a transmission mounted on the vehicle 1. The vehicle speed sensor 11 detects a vehicle body speed, which is the speed of the vehicle 1 (the vehicle body 2). Detection information of the vehicle speed sensor 11 (a signal corresponding to the vehicle body speed) is, for example, output to various kinds of controllers (ECUs) mounted on the vehicle via a CAN 16 (FIG. 2, which will be described below), which is in-vehicle LAN communication. The information of the vehicle speed sensor 11 (the vehicle body speed) is output to a controller (a braking/driving ECU, a braking ECU, and a driving ECU) of a braking/driving system (a braking system and a driving system) of the vehicle 1, a controller (a steering ECU) of a steering system of the vehicle 1, and the like via the CAN 16, although this is not illustrated. Further, the information of the vehicle speed sensor 11 (the vehicle body speed) is output to the controller 21 (a suspension ECU) of the suspension system of the vehicle 1 via the CAN 16 as illustrated in FIG. 2, which will be described below.

The wheel speed sensors 12 are each disposed on, for example, a wheel support hub unit that supports the wheel 3 or 4. The wheel speed sensors 12 are provided in correspondence with the respective wheels 3 and 4. The wheel speed sensors 12 detect rotational speeds of the wheels 3 and 4. Detection information of the wheel speed sensors 12 (signals corresponding to the wheel speeds) are, for example, output to various kinds of controllers (ECUs) via the CAN 16. The information of the wheel speed sensors 12 (the wheel speeds) is output to the controller (the braking/driving ECU, the braking ECU, and the driving ECU) of the braking/driving system (the braking system and the driving system) of the vehicle 1, and the like via the CAN 16, although this is not illustrated. Further, the information of the wheel speed sensors 12 (the vehicle body speeds) is output to the controller 21 (the suspension ECU) of the suspension system of the vehicle 1 via the CAN 16 as illustrated in FIG. 2, which will be described below. The vehicle 1 may be configured in such a manner that the vehicle speed sensor 11 is omitted and the vehicle body speed is acquired based on the wheel speeds of the wheel speed sensors 12.

The longitudinal acceleration sensor 13 and the lateral acceleration sensor 14 are disposed on, for example, the vehicle body 2 located on a sprung side of the vehicle 1. The longitudinal acceleration sensor 13 detects an acceleration (a deceleration and an acceleration) of the vehicle 1 (the vehicle body 2) in the longitudinal direction. The lateral acceleration sensor 14 detects an acceleration (a lateral acceleration) of the vehicle 1 (the vehicle body 2) in the lateral direction. Detection data of the longitudinal acceleration sensor 13 (a signal corresponding to the longitudinal acceleration) and detection data of the lateral acceleration sensor 14 (a signal corresponding to the lateral acceleration) are, for example, output to various kinds of controllers (ECUs) via the CAN 16. The information of the longitudinal acceleration sensor 13 (the longitudinal acceleration) and the information of the lateral acceleration sensor 14 (the lateral acceleration) are output to the controller (the braking/driving ECU, the braking ECU, and the driving ECU) of the braking/driving system (the braking system and the driving system) of the vehicle 1 via the CAN 16, although this is not illustrated. Further, the information of the longitudinal acceleration sensor 13 (the longitudinal acceleration) and the information of the lateral acceleration sensor 14 (the lateral acceleration) are output to the controller 21 (the suspension ECU) of the suspension system of the vehicle 1 via the CAN 16 as illustrated in FIG. 2, which will be described below.

The steering angle sensor 15 is disposed on, for example, a steering apparatus (not illustrated) of the vehicle 1. The steering angle sensor 15 detects a steering angle (a rotational angle) or a steered angle of the wheel (the front wheel 3) generated by a steering operation of a driver (an operator) driving the vehicle 1. Detection data of the steering angle sensor 15 (a signal corresponding to the steering angle) is, for example, output to various kinds of controllers (ECUs) via the CAN 16. The information of the steering angle sensor 15 (the steering angle) is output to the controller (the steering ECU) of the steering system of the vehicle 1 and the like via the CAN 16, although this is not illustrated. Further, the information of the steering angle sensor 15 (the steering angle) is output to the controller 21 (the suspension ECU) of the suspension system of the vehicle 1 via the CAN 16 as illustrated in FIG. 2, which will be described below.

Now, each of the sensors 11, 12, 13, 14, and 15 is not a sensor dedicated to the suspension system (the shock absorbers 7 and 10). In other words, each of the sensors 11, 12, 13, 14, and 15 is a sensor mounted on the vehicle for a purpose other than control of the shock absorbers 7 and 10, i.e., a sensor mounted on the vehicle to mainly control an in-vehicle apparatus other than the shock absorbers 7 and 10. More specifically, the sensors 11, 12, 13, 14, and 15 are mounted on the vehicle 1 as sensors intended to mainly control a vehicle braking/driving apparatus (a driving apparatus and a braking apparatus) such as an engine, a running driving motor, a hydraulic brake, and an electric brake that drive and/or brake the vehicle 1, and a steering apparatus such as an electric power steering apparatus that steers the vehicle 1. Then, the vehicle braking/driving apparatus (the driving apparatus and the braking apparatus) and the steering apparatus correspond to the in-vehicle apparatus (an in-vehicle system) for controlling the vehicle 1 (controlling a behavior of the vehicle 1).

In this case, the vehicle speed sensor 11, the wheel speed sensors 12, the longitudinal acceleration sensor 13, and the lateral acceleration sensor 14 are sensors for the vehicle braking/driving system for controlling the braking and the driving of the vehicle 1. In other words, the vehicle speed sensor 11, the wheel speed sensors 12, the longitudinal acceleration sensor 13, and the lateral acceleration sensor 14 are sensors mainly used to control the vehicle braking/driving apparatus (the engine, the running driving motor, the hydraulic brake, the electric brake, or the like). The steering angle sensor 15 is a sensor for the steering system for controlling the steering of the vehicle 1. In other words, the steering angle sensor 15 is a sensor mainly used to control the steering apparatus (the electric power steering apparatus). In any case, each of the sensors 11, 12, 13, 14, and 15 is connected to the CAN 16 serving as a serial communication portion that carries out in-vehicle multiplex communication between a large number of electronic apparatuses including various kinds of ECUs such as the controller 21 and various kinds of sensors mounted on the vehicle 1.

Next, the controller 21, which controls the shock absorbers 7 and 10, will be described.

The controller 21 as a vehicle control apparatus includes a microcomputer, a power source circuit, and a driving circuit, and is also called an ECU (Electronic Control Unit). The controller 21 is a controller (a controller) for the suspension system, i.e., a suspension ECU (a shock absorber ECU). The controller 21 controls the shock absorbers 7 and 10 (adjusts the damping forces thereof) based on the sensor information detected by, for example, the sensors 11, 12, 13, 14, and 15 other than a sensor dedicated to the shock absorbers 7 and 10. In this case, the controller 21 estimates the state of the vehicle 1 based on the sensor information, and controls the shock absorbers 7 and 10 according to the estimated state of the vehicle 1.

As illustrated in FIG. 2, the controller 21 is connected to the CAN 16. Due to this connection, the signal of the vehicle speed sensor 11, the signals of the wheel speed sensors 12, the signal of the longitudinal acceleration sensor 13, the signal of the lateral acceleration sensor 14, and the signal of the steering angle sensor 15 are input to the controller 21 via the CAN 16 as CAN signals. Further, a signal of a gyro sensor 17A of a navigation apparatus 17 is input to the controller 21 as an in-vehicle gyro signal via the CAN 16, as will be described below. On the other hand, the output side of the controller 21 is connected to the shock absorbers 7 and 10, which are control dampers. The controller 21 outputs a control signal (an instruction current) to the actuator of each of the shock absorbers 7 and 10 (for example, the solenoid that adjusts the valve-opening pressure of the damping force adjustment valve).

The controller 21 includes a control portion 21A (refer to FIG. 1), which performs arithmetic processing, such as a CPU (an arithmetic processing unit), and a storage portion 21B (refer to FIG. 1), which is formed by a memory such as a ROM, a RAM, and a nonvolatile memory. The storage portion 21B stores therein a processing program for calculating (estimating) the vehicle state (the vehicle motion and the vehicle behavior) based on the information (the input signals) of, for example, the sensors 11, 12, 13, 14, and 15, a processing program for calculating damping forces that should be generated by the shock absorbers 7 and 10 based on the state of the vehicle (the vehicle motion and the vehicle behavior), a processing program for outputting a control signal corresponding to the damping force that should be generated, and the like.

For example, the skyhook control law, the LQG control law, or the H∞ control law can be used as a control law that calculates the damping forces of the shock absorbers 7 and 10 (a control law for ride comfort or a control law for steering stability). The controller 21, for example, increases the damping forces of the shock absorbers 7 and 10 when decelerating the motion (the behavior) of the vehicle body 2 located on the sprung side with the aid of the damping forces of the shock absorbers 7 and 10, and suppresses the damping forces of the shock absorbers 7 and 10 when accelerating the motion (the behavior) of the vehicle body 2 located on the sprung side with the aid of the damping forces of the shock absorbers 7 and 10. The shock absorbers 7 and 10, which are damping force variable dampers, work to change the damping forces to appropriately damp a vertical motion of each of the wheels 3 and 4, thereby suppressing the vibration of the vehicle body 2.

Then, a suspension system of a vehicle (an automobile) is a unit for achieving both ride comfort and steering stability of the vehicle (the automobile). A semi-active suspension system improves ride comfort and steering stability by switching the damping force of a damping force variable shock absorber mounted between a vehicle body and a wheel to thus control the motion of the vehicle body. Systems having various sensor configurations have been considered for such a suspension system.

For example, a conventional suspension system controls the damping force of the damping force variable shock absorber using information of a sprung acceleration sensor, an unsprung acceleration sensor, a vehicle height sensor, and the like, and information sensed by another system that is acquired via in-vehicle LAN communication (CAN communication). More specifically, the conventional suspension system estimates (calculates) the vehicle state based on the "information of a sensor dedicated to the suspension system (the sprung acceleration sensor, the unsprung acceleration sensor, and the vehicle height sensor)" and the "information sensed by another system", and controls the damping force variable shock absorber according to the estimated vehicle state. In the case of such a configuration, as the number of sensors increases, the accuracy of estimating the vehicle state increases and the ride comfort and the steering stability can be improved, but an increase in the system cost is unavoidable.

On the other hand, one possible example as the most affordable system is to control the suspension by estimating the state of the vehicle (the vehicle body) using information sensed by another system without including a sensor for the suspension system. For example, according to the technique discussed in the above-described patent literature, PTL 1, the state of the vehicle body is estimated based on the sensor information acquired from the braking/driving control system and the steering control system of the vehicle. One possible method for estimating the state of the vehicle body in this case is to use a Kalman filter, which is one type of observer. However, in the case where the vehicle motion state estimation apparatus is configured to calculate the state using estimated values for all of the fluctuation component of the vehicle speed due to the vertical motion of the vehicle body, the roll rate, and the pitch rate as observed values of the Kalman filter, a reduction in the accuracy of estimating the observed values may also lead to a reduction in the accuracy of estimating the state of the vehicle body.

In light thereof, in the embodiment, the vehicle state is estimated only using information acquired via the in-vehicle LAN communication (CAN communication) without a sensor dedicated to the suspension system prepared. In this case, in the embodiment, the accuracy of estimating the state of the vehicle is improved by directly inputting sensor information that is different from sensor information acquired from the existing braking/driving control system and steering control system and is available from a system outside the suspension system, as the observed values. Further, in the embodiment, regarding a directly sensible physical amount among physical amounts used in the control of the suspension system, the value thereof can be directly used in the control or an estimated value with a noise component removed therefrom can also be used. Therefore, the control performance can be improved by selectively using the "directly sensed accurate value" and the "value with noise removed therefrom" according to intended use.

More specifically, in the embodiment, the suspension system includes the shock absorbers 7 and 10, the controller 21 that outputs the control signals to the shock absorbers 7 and 10, and the wheel speed sensors 12 mounted on the vehicle 1. The suspension system estimates the state of the vehicle 1 based on the wheel speed information of the wheel speed sensors 12 and controls the damping forces of the shock absorbers 7 and 10 according to the estimated state of the vehicle 1. In this case, the suspension system uses sensor information of an in-vehicle system other than the system for controlling the vehicle 1 (for example, the braking/driving system and the steering system) to control the shock absorbers 7 and 10.

That is, in the first embodiment, the suspension system uses the sensor information of the navigation system (the navigation apparatus 17), which corresponds to the in-vehicle system other than the system for controlling the vehicle 1 (controlling the behavior of the vehicle 1), to control the shock absorbers 7 and 10. More specifically, the suspension system uses gyro information, which corresponds to the sensor information of the gyro sensor 17A mounted on the navigation system (the navigation apparatus 17), as the observed values in the estimation of the state of the vehicle 1 (the Kalman filter).

In other words, the controller 21 (the control portion 21A) estimates the state of the vehicle 1 based on the wheel speed sensors 12 mounted on the vehicle 1 and outputs the control signals to the shock absorbers 7 and 10 according to the estimated state of the vehicle 1. In this case, the controller 21 uses the sensor information of the in-vehicle apparatus other than an apparatus dedicated to the shock absorbers 7 and 10 to estimate the state of the vehicle 1. That is, the controller 21 uses the sensor information of the navigation apparatus 17, which corresponds to the in-vehicle apparatus other than the apparatus dedicated to the shock absorbers 7 and 10, to estimate the state of the vehicle 1. More specifically, the controller 21 uses the gyro information, which means the information of the gyro sensor 17A mounted on the navigation apparatus 17, to estimate the state of the vehicle 1 as the observed values in the estimation of the state of the vehicle 1 (the Kalman filter). The gyro sensor 17A corresponds to the sensor other than a sensor dedicated to the shock absorbers 7 and 10.

To achieve that, the vehicle 1 includes the navigation apparatus 17 with the gyro sensor 17A mounted thereon as illustrated in FIG. 1. The navigation apparatus 17 is connected to the CAN 16, which serves as the in-vehicle LAN. The gyro information, which means the sensor information of the gyro sensor 17A, is output to the controller 21 of the suspension system of the vehicle 1 via the CAN 16. The gyro sensor 17A detects an angular velocity around at least any one axis among three axes, namely, a roll axis extending in the longitudinal direction of the vehicle 1 (the vehicle body 2), a pitch axis extending in the lateral direction of the vehicle 1 (the vehicle body 2), and a yaw axis extending in the vertical direction of the vehicle 1 (the vehicle body 2).

In other words, the gyro sensor 17A detects at least any of a roll rate, which corresponds to a rotational angular velocity in the roll direction of the vehicle 1, a pitch rate, which corresponds to a rotational angular velocity in the pitch direction of the vehicle 1, or a yaw rate, which corresponds to a rotational angular velocity in the yaw direction of the vehicle 1. For example, in the embodiment, the gyro sensor 17A detects the roll rate and the pitch rate. The roll rate and the pitch rate detected by the gyro sensor 17A are output to the controller 21 via the CAN 16.

The controller 21 will be described with reference to FIG. 2. In FIG. 2, in-vehicle gyro signals (the roll rate and the pitch rate), which are the sensor information of the navigation system 17, and CAN signals other than the in-vehicle gyro signals (the vehicle body speed, the w % heel speeds, the longitudinal acceleration, the lateral acceleration, the steering angle, and the like) are illustrated separately from each other. A purpose therefor is to clearly indicate that the in-vehicle gyro signals are input from the gyro sensor 17A of the navigation apparatus 17 to the controller 21. In the first embodiment, for example, all of the signals are input to the controller 21 via the CAN 16 forming the in-vehicle LAN.

As illustrated in FIG. 2, the controller 21 includes a vehicle body state estimation portion 22 (a vehicle state estimation portion) and a suspension control portion 23 (a control signal output portion). The vehicle body state estimation portion 22 estimates the vehicle state (the vehicle body state) based on the input signals input via the CAN 16. More specifically, the vehicle body state estimation portion 22 calculates the vehicle state such as the sprung speeds, the piston speeds, the piston displacements, the roll rate, and the pitch rate based on the input signals corresponding to the vehicle body speed, the wheel speeds, the longitudinal acceleration, the lateral acceleration, the steering angle, the roll rate, the pitch rate, and the like.

The sprung speeds correspond to, for example, the vertical speeds of the vehicle body 2 at the positions of the wheels 3 and 4, the piston speeds correspond to the speeds (the compression/extension speeds or the relative speeds) of the pistons of the shock absorbers 7 and 10, and the piston displacements correspond to the displacement amounts (the compression/extension amounts) of the pistons of the shock absorbers 7 and 10. The vehicle body state estimation portion 22 outputs the estimated vehicle state (the sprung speeds, the piston speeds, the piston displacements, the roll rate, the pitch rate, and the like) to the suspension control portion 23.

The vehicle body state estimation portion 22 includes a vertical fluctuation-induced wheel speed extraction portion 22A, a correction value estimation portion 22B, and a vertical motion estimation portion 22C. The vehicle body speed, the wheel speeds, the longitudinal acceleration, the lateral acceleration, and the steering angle are input to the vertical fluctuation-induced wheel speed extraction portion 22A via the CAN 16. Further, the gyro information, i.e., the pitch rate and the roll rate are input from the gyro sensor 17A of the navigation apparatus 17 to the vertical fluctuation-induced wheel speed extraction portion 22A via the CAN 16.

The vertical fluctuation-induced wheel speed extraction portion 22A estimates changes in the wheel speeds induced by a vertical motion similarly to a "wheel speed fluctuation estimation unit 52" discussed in PTL 1. More specifically, the vertical fluctuation-induced wheel speed extraction portion 22A extracts (estimates or calculates) wheel speed fluctuation components caused by a vertical motion that is generated due to a vertical road surface displacement or a vertical motion of the vehicle 1 by receiving the vehicle body speed, the wheel speeds, the longitudinal acceleration, the lateral acceleration, the steering angle, the pitch rate, and the roll rate as inputs, and outputs them to the vertical motion estimation portion 22C as the vertical fluctuation-induced wheel speeds. The processing for calculating the wheel speeds due to a vertical fluctuation is discussed in various kinds of documents (documents regarding the estimation of the vehicle state) including published patent literatures such as PTL 1, and therefore further descriptions thereof will be omitted herein.

The vehicle body speed, the wheel speeds, the longitudinal acceleration, the lateral acceleration, and the steering angle are input to the correction value estimation portion 22B. Further, the sprung speeds, the piston speeds, the piston displacements, the roll rate, and the pitch rate are input from the vertical motion estimation portion 22C to the correction value estimation portion 22B. The correction value estimation portion 22B estimates the correction value in a similar manner to a "correction value estimation unit 54" discussed in PTL 1. More specifically, the correction value estimation portion 22B estimates the correction value by receiving the vehicle body speed, the wheel speeds, the longitudinal acceleration, the lateral acceleration, the steering angle, the sprung speeds, the piston speeds, the piston displacements, the roll rate, and the pitch rate as inputs, and outputs this correction value to the vertical motion estimation portion 22C. The processing for calculating the correction value is discussed in various kinds of documents (documents regarding the estimation of the vehicle state) including published patent literatures such as PTL 1, and therefore further descriptions thereof will be omitted herein.

The correction value is input from the correction value estimation portion 22B to the vertical motion estimation portion 22C. Further, the wheel speeds due to a vertical fluctuation are input from the vertical fluctuation-induced wheel speed extraction portion 22A to the vertical motion estimation portion 22C. Further, the pitch rate and the roll rate, which are the gyro information from the gyro sensor 17A of the navigation apparatus 17, are input to the vertical motion estimation portion 22C. The vertical motion estimation portion 22C is an observer that estimates a vertical motion state amount of the vehicle 1 similarly to a "vertical motion estimation unit 55" discussed in PTL 1. More specifically, the vertical motion estimation portion 22C is an observer that estimates unmeasurable information using a vehicle model (a motion equation) modeling the vehicle, more specifically, a Kalman filter that estimates a current value based on a previous estimated value and an observed value.

The vertical fluctuation-induced wheel speeds and the gyro information (the pitch rate and the roll rate) are input to the vertical motion estimation portion 22C as the observed values. The vertical motion estimation portion 22C estimates the sprung speeds, the piston speeds, the piston displacements, the roll rate, and the pitch rate, which are state values of the vehicle 1, based on the correction value acquired as the input value and the vertical fluctuation-induced wheel speeds and the gyro information (the pitch rate and the roll rate) acquired as the observed values.

In the present embodiment, the gyro information (the pitch rate and the roll rate) of the navigation apparatus 17 is input as the observed values, and therefore the accuracy of estimating the state of the vehicle 1 can be improved. The sprung speeds, the piston speeds, the piston displacements, the roll rate, and the pitch rate estimated by the vertical motion estimation portion 22C are output to the correction value estimation portion 22B and the suspension control portion 23. The technique for estimating the sprung speeds, the piston speeds, the piston displacements, and the like based on the wheel speeds and the like using the observer (the Kalman filter) is discussed in various kinds of documents (documents regarding the estimation of the vehicle state) including published patent literatures such as PTL 1, and therefore further descriptions thereof will be omitted herein.

The sprung speeds, the piston speeds, the piston displacements, the roll rate, and the pitch rate are input from the vehicle body state estimation portion 22 (more specifically, the vertical motion estimation portion 22C) to the suspension control portion 23. Further, the vehicle body speed, the wheel speeds, the longitudinal acceleration, the lateral acceleration, and the steering angle are input to the suspension control portion 23. Further, the gyro information, i.e., the pitch rate and the roll rate are input from the gyro sensor 17A of the navigation apparatus 17 to the suspension control portion 23.

The suspension control portion 23 calculates the damping forces that should be generated by the shock absorbers 7 and 10 according to these inputs. More specifically, the suspension control portion 23 calculates the damping forces that should be generated by the shock absorbers 7 and 10 according to the sprung speeds, the piston speeds, the piston displacements, the roll rate, the pitch rate, the vehicle body speed, the wheel speeds, the longitudinal acceleration, the lateral acceleration, and the steering angle, which correspond to the vehicle state. The suspension control portion 23 outputs control signals (instruction currents) according to the damping forces that should be generated by the shock absorbers 7 and 10 to the shock absorbers 7 and 10, which are the control dampers. In other words, the suspension control portion 23 outputs instruction currents (control signals) corresponding to damper instruction values to the actuators of the shock absorbers 7 and 10 (for example, the solenoids that adjust the valve-opening pressures of the damping force adjustment valves).

Now, in the first embodiment, the controller 21 identifies the rotational angular velocity in the roll direction and the rotational angular velocity in the pitch direction of the vehicle 1 based on the information of the gyro sensor 17A as a rotational motion of the vehicle. More specifically, the vehicle body state estimation portion 22 of the controller 21 converts the pitch rate and the roll rate that are the gyro information detected by the gyro sensor 17A of the navigation apparatus 17 (a detected pitch rate and a detected roll rate) into the pitch rate and the roll rate that correspond to the rotational motion of the vehicle 1 (the vehicle body 2) (a vehicle body pitch rate and a vehicle body roll rate) as necessary. If the conversion is unnecessary, the detected pitch rate and roll rate directly correspond to the pitch rate and the roll rate of the vehicle 1 (the vehicle body 2), respectively.

The vehicle body state estimation portion 22 of the controller 21 estimates the state of the vehicle 1 (the sprung speeds, the piston speeds, the piston displacements, the roll rate, and the pitch rate) based on the identified rotational motion of the vehicle 1 (the pitch rate and the roll rate) and the running state information of the vehicle 1 (the vehicle body speed, the wheel speeds, the longitudinal acceleration, the lateral acceleration, and the steering angle). In this case, the running state information of the vehicle 1 includes at least wheel speed information. More specifically, the vehicle body state estimation portion 22 identifies the vertical motion of the vehicle 1 based on the wheel speed information (at least the wheel speed information) and estimates the state of the vehicle 1 based on the vertical motion of the vehicle 1 and the rotational motion of the vehicle 1.

More specifically, the vertical motion estimation portion 22C of the vehicle body state estimation portion 22 identifies the vertical motion (the sprung speeds, the piston speeds, and the piston displacements) of the vehicle 1 based on the wheel speed information (the vertical fluctuation-induced wheel speeds) and the rotational motion (the pitch rate and the roll rate) of the vehicle 1, and estimates the state (the sprung speeds, the piston speeds, the piston displacements, the roll rate, and the pitch rate) of the vehicle 1 based on the vertical motion of the vehicle 1 and the rotational motion of the vehicle 1. Then, the suspension control portion 23 of the controller 21 outputs the control signals to the shock absorbers 7 and 10 according to the estimated state of the vehicle 1 (the sprung speeds, the piston speeds, the piston displacements, the roll rate, and the pitch rate) and the rotational motion of the vehicle 1 (the pitch rate and the roll rate).

In this manner, in the first embodiment, the vehicle 1 includes the navigation system (the navigation apparatus 17), which corresponds to the in-vehicle system other than the suspension system. Then, the angular speed information of the gyro sensor 17A in the pitch direction and the roll direction that is sensed by the navigation system is input to the controller 21 via the in-vehicle LAN communication such as the CAN 16 as additional sensed information. Regarding the angular speed information of the gyro sensor 17A, a correct value can be acquired free of influence from the installation angle or the installation position. As a result, the accuracy of estimating the state of the vehicle 1 (the vehicle body 2) can be improved by using the pitch rate and the roll rate as the observed values.

Further, for example, the estimated pitch rate and roll rate have advantages that noise can be removed and no delay occurs. The directly sensed pitch rate and roll rate have an advantage that the accuracy thereof is high, but noise may be superimposed thereon, and removing the noise via a filter causes a phase shift. Therefore, using both of them in the suspension control according to the intended use can also improve the control performance of the suspension system. For example, the undelayed estimated value is used in the control of ride comfort, for which responsiveness is important, and the sensed value is used with respect to a value exceeding an estimable frequency or when a failure makes the estimation impossible. For example, the vertical fluctuation-induced wheel speed extraction portion 22A and the vertical motion estimation portion 22C use the "directly sensed pitch rate and roll rate" and the suspension control portion 23 uses the "directly sensed pitch rate and roll rate" and the "estimated pitch rate and roll rate". As a result, the control performance can be improved.

The vehicle control apparatus and the suspension system according to the first embodiment are configured in the above-described manner, and the function thereof will be described next.

When the behavior (the state) of the vehicle 1 changes as, for example, the vehicle 1 runs, this change in the behavior is detected by the vehicle speed sensor 11, the wheel speed sensors 12, the longitudinal acceleration sensor 13, the lateral acceleration sensor 14, the steering angle sensor 15, and the like, and is input to the controller 21, which controls the shock absorbers 7 and 10, via the CAN 16. Further, the change in the behavior (the state) of the vehicle 1 is detected by the gyro sensor 17A of the navigation apparatus 17, which corresponds to the in-vehicle apparatus other than the apparatus dedicated to the shock absorbers 7 and 10 mounted on the vehicle 1, and is input to the controller 21 via the CAN 16. In other words, the controller 21 receives not only the signals of the various kinds of sensors 11, 12, 13, 14, and 15 mounted on the vehicle 1 but also the signal of the gyro sensor 17A of the navigation apparatus 17. The controller 21 outputs the control signals for controlling the damping forces of the shock absorbers 7 and 10 to the shock absorbers 7 and 10 based on the received signals. As a result, the control accuracy can be improved even if no sensor dedicated to the shock absorbers 7 and 10 is mounted on the vehicle 1.

In other words, in the first embodiment, the information of the gyro sensor 17A of the navigation apparatus 17, which is the in-vehicle apparatus other than the apparatus dedicated to the shock absorbers 7 and 10, is used to estimate the state of the vehicle 1. Therefore, even in the sensor-less configuration not including a sensor dedicated to the shock absorbers 7 and 10, the information of the gyro sensor 17A of the navigation apparatus 17 can be used to estimate the vehicle state (for example, the vertical motion of the vehicle body, the vehicle speed, the braking/driving state, and a wheel slip) as the observed values. As a result, the accuracy of estimating the vehicle state can be improved and the vibration damping performance by the shock absorbers 7 and 10 can be enhanced. In this case, the navigation apparatus 17 includes the gyro sensor 17A and is also mounted on the vehicle 1 at a fixed position, and therefore the accuracy of estimating the state of the vehicle 1 can be improved.

In the first embodiment, the state of the vehicle 1 (the sprung speeds, the piston speeds, the piston displacements, the roll rate, and the pitch rate) can be estimated based on the rotational motion of the vehicle 1 (the roll rate and the pitch rate) identified based on the information of the gyro sensor 17A and the running state information of the vehicle 1 (the vehicle body speed, the wheel speeds, the longitudinal acceleration, the lateral acceleration, and the steering angle). The gyro sensor 17A can measure the correct roll rate and pitch rate free of influence from the installation angle of the navigation apparatus 17. Therefore, the accuracy of estimating the sprung speeds, the piston speeds, and the like can be improved by using the correct roll rate and pitch rate acquired from the navigation apparatus 17 as the observed values.

In the first embodiment, the suspension control portion 23 of the controller 21 outputs the control signals to the shock absorbers 7 and 10 according to the state of the vehicle 1 (the sprung speeds, the piston speeds, the piston displacements, the roll rate, and the pitch rate) estimated by the vehicle body state estimation portion 22 and the rotational motion of the vehicle 1 (the roll rate and the pitch rate) based on the information of the gyro sensor 17A of the navigation apparatus 17. Therefore, the rotational motion of the vehicle 1 (the roll rate and the pitch rate) identified based on the information of the gyro sensor 17A can also be used to output the control signals in addition to being used to estimate the state of the vehicle 1. As a result, the control signals can be output using the correct roll rate and pitch rate, and the control performance can be improved.

In the first embodiment, the vehicle body state estimation portion 22 of the controller 21 (more specifically, the vertical motion estimation portion 22C) identifies the vertical motion of the vehicle 1 based on the wheel speed information (the vertical fluctuation-induced wheel speeds), and estimates the state of the vehicle (the sprung speeds, the piston speeds, the piston displacements, the roll rate, and the pitch rate) based on the vertical motion of the vehicle 1 and the rotational motion of the vehicle 1 (the roll rate and the pitch rate). Therefore, the state of the vehicle 1 (the sprung speeds, the piston speeds, the piston displacements, the roll rate, and the pitch rate) can be estimated based on the rotational motion of the vehicle 1 (the roll rate and the pitch rate) that is identified based on the information of the gyro sensor 17A and the running state information of the vehicle 1 (the vehicle body speed, the wheel speeds, the longitudinal acceleration, the lateral acceleration, and the steering angle) that includes the wheel speed information.

In the first embodiment, the vehicle body state estimation portion 22 of the controller 21 (more specifically, the vertical motion estimation portion 22C) identifies the vertical motion of the vehicle 1 based on the wheel speed information (the vertical fluctuation-induced wheel speeds) and the rotational motion of the vehicle 1 (the roll rate and the pitch rate), and estimates the state of the vehicle 1 based on the vertical motion of the vehicle 1 and the rotational motion of the vehicle 1 (the roll rate and the pitch rate). Therefore, the state of the vehicle 1 can be estimated based on the vertical motion of the vehicle 1 and the rotational motion of the vehicle 1.

Figure 3:
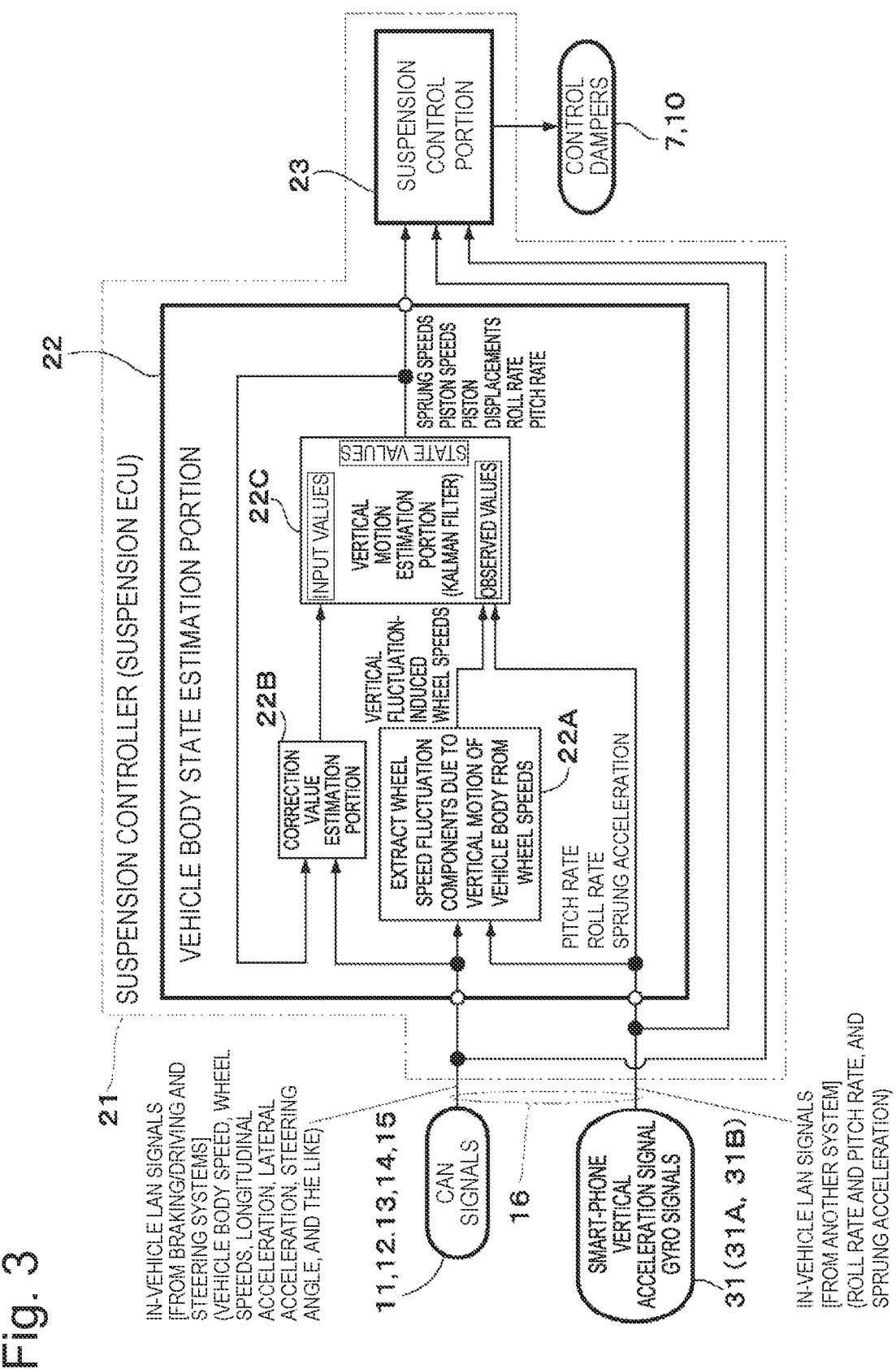
FIG. 3 is a block diagram illustrating a controller and the like according to a second embodiment.

Next, FIG. 3 illustrates a second embodiment. The second embodiment is characterized by being configured to use a mobile apparatus brought in the vehicle as the in-vehicle apparatus other than the damping force variable shock absorber The second embodiment will be described, identifying similar components to the above-described first embodiment by the same reference numerals and omitting descriptions thereof.

The above-described first embodiment is configured to use the sensor information of the navigation system (the navigation apparatus 17). On the other hand, the second embodiment is configured to use sensor information of the mobile apparatus (a mobile system) instead of the navigation system (the navigation apparatus 17). More specifically, in the second embodiment, the in-vehicle apparatus other than the shock absorbers 7 and 10 is a smartphone 31, which corresponds to the mobile apparatus brought in the vehicle. The second embodiment will be described citing the example in which the smartphone 31 is used as the mobile apparatus, but examples usable as the mobile apparatus include various kinds of mobile information terminals such as a mobile phone (a feature phone), a tablet terminal, and a tablet PC, more specifically, a mobile information terminal including a state detection sensor such as a gyro sensor mounted thereon.

In the second embodiment, the smartphone 31 is brought in the vehicle 1 as indicated by an imaginary line (a long dashed double-short dashed line) in FIG. 1. A gyro sensor 31A and an acceleration sensor 31B are mounted on the smartphone 31. In other words, in the second embodiment, the suspension system uses sensor information of a mobile system (the smartphone 31) corresponding to the in-vehicle system other than the system for controlling the vehicle 1 to control the shock absorbers 7 and 10. More specifically, the suspension system uses information of the gyro sensor 31A and the acceleration sensor 31B mounted on the mobile system (the smartphone 31) as the observed values in the estimation of the state of the vehicle 1.

As illustrated in FIG. 3, the smartphone 31 is connected to the CAN 16, which serves as the in-vehicle LAN. Gyro information, which means the sensor information of the gyro sensor 31A, and acceleration information, which means the sensor information of the acceleration sensor 31B, are output to the controller 21 via the CAN 16. The controller 21 identifies the rotational angular velocity in the roll direction and the rotational angular velocity in the pitch direction of the vehicle 1 based on the information of the gyro sensor 31A of the smartphone 31 as the rotational motion of the vehicle. More specifically, the vehicle body state estimation portion 22 of the controller 21 converts the pitch rate and the roll rate that are the gyro information detected by the gyro sensor 31A of the smartphone 31 (the detected pitch rate and the detected roll rate) into the pitch rate and the roll rate that correspond to the rotational motion of the vehicle 1 (the vehicle body 2) (the vehicle body pitch rate and the vehicle body roll rate).

Further, the controller 21 identifies a sprung vertical acceleration of the vehicle 1 (a vertical acceleration of the vehicle body 2) based on the acceleration sensor 31B mounted on the smartphone 31. More specifically, the vehicle body state estimation portion 22 of the controller 21 converts a vertical acceleration that is acceleration information detected by the acceleration sensor 31B of the smartphone 31 (a detected vertical acceleration) into a sprung vertical acceleration that corresponds to a vertical acceleration of the vehicle body 2 (a vehicle body vertical acceleration). The vehicle body state estimation portion 22 of the controller 21 estimates the state of the vehicle 1 (the sprung speeds, the piston speeds, the piston displacements, the roll rate, and the pitch rate) based on the rotational motion of the vehicle 1 (the pitch rate and the roll rate), the sprung vertical acceleration, and the running state information of the vehicle 1 (the vehicle body speed, the wheel speeds, the longitudinal acceleration, the lateral acceleration, and the steering angle).

In this manner, in the second embodiment, the vehicle 1 includes the mobile system (the smartphone 31), which is the in-vehicle system other than the suspension system. Then, the angular speed information of the gyro sensor in the pitch direction and the roll direction that is sensed by the mobile system (the smartphone 31) and the acceleration information of the vehicle body 2 (the sprung side) in the vertical direction (the sprung vertical acceleration) are input to the controller 21 via the in-vehicle LAN communication such as the CAN 16 as additional sensed information. In other words, compared to the first embodiment, the acceleration information of the vehicle body 2 (the sprung side) in the vertical direction (the sprung vertical acceleration) is input to the controller 21 as further additional sensed information.

The sprung vertical acceleration is acquired with a component of a gravitational acceleration superimposed thereon due to a tilt of the acceleration sensor, and therefore a correct sprung acceleration can be calculated by calculating tilt angles in the roll direction and the pitch direction based on the gyro signal or the like or calculating an angle based on a DC component of the acceleration sensor, and removing the gravitational component corresponding to this tilt. Then, the accuracy of estimating the state of the vehicle 1 (the vehicle body 2) can be improved by using this correct sprung vertical acceleration as the observed value in the estimation of the state of the vehicle body 2.

Further, for example, the estimated sprung vertical acceleration or sprung vertical speed has an advantage that noise can be removed therefrom, and the directly sensed sprung vertical acceleration or the sprung vertical speed calculated based on this sprung vertical acceleration has an advantage that the accuracy thereof is high. Therefore, using them according to the intended use can also improve the control performance of the suspension system.

The second embodiment has been described citing the example in which the vehicle 1 is configured to use the pitch rate, the roll rate, and the sprung acceleration acquired by the smartphone 31 as the observed values, but the vehicle 1 may be configured to use, for example, only the sprung acceleration of the smartphone 31 as the observed value. Further, for example, the vehicle 1 may be configured to include both the navigation apparatus 17 according to the first embodiment and the smartphone 31 according to the second embodiment. In this case, the vehicle 1 may be configured to, for example, use the pitch rate and the roll rate acquired by the navigation apparatus 17 and the sprung acceleration acquired by the smartphone 31 as the observed values.

The second embodiment is configured to estimate the state of the vehicle 1 using the sensor information acquired by the smartphone 31 as described above, and a basic function thereof is not especially different from the function fulfilled by the above-described first embodiment. Especially, in the second embodiment, the vehicle 1 uses the smartphone 31 as the in-vehicle apparatus other than the shock absorbers 7 and 10, and the smartphone 31 includes the gyro sensor 31A and the acceleration sensor 31B. Therefore, the accuracy of estimating the state of the vehicle can be improved by using these pieces of sensor information. In other words, in the second embodiment, the state of the vehicle 1 can be estimated by also using the acceleration sensor 31B mounted on the smartphone 31. Therefore, the sensor value of the acceleration sensor 31B (the sprung acceleration) can be used as the observed values in addition to the information of the gyro sensor 31A. Due to that, the accuracy of estimating the piston speeds can be improved, and a further correct roll rate, pitch rate, and sprung acceleration (and/or sprung speed) can be used in the control. As a result, the control performance can also be improved from this viewpoint.

Figure 4:
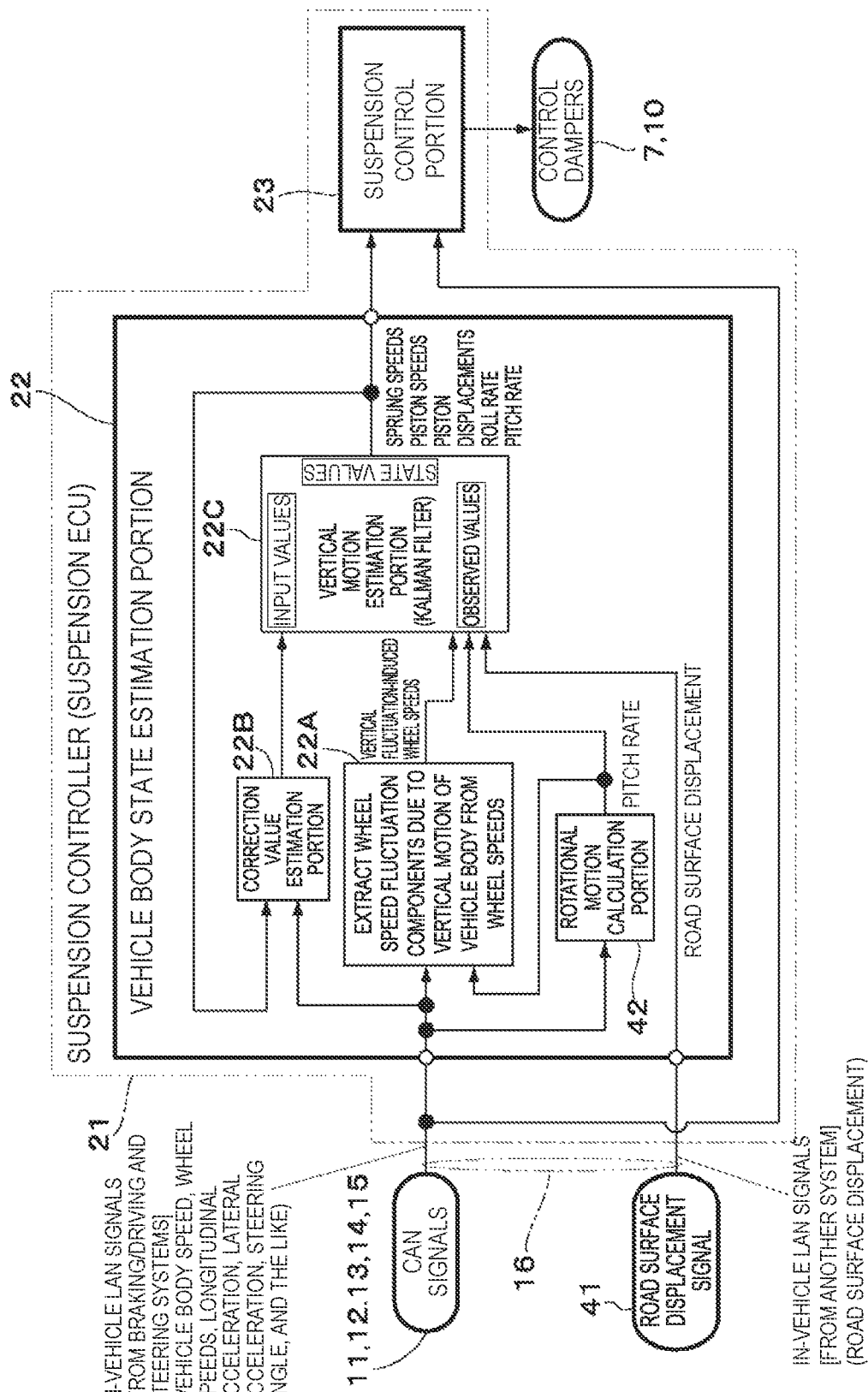
FIG. 4 is a block diagram illustrating a controller and the like according to a third embodiment.

Next, FIG. 4 illustrates a third embodiment. The third embodiment is characterized by being configured to use an external world perception system as the in-vehicle apparatus other than the damping force variable shock absorber. The third embodiment will be described, identifying similar components to the above-described first embodiment by the same reference numerals and omitting descriptions thereof.

In the third embodiment, sensor information of an external world perception system (an external world perception apparatus 41) is used. In other words, in the third embodiment, the in-vehicle apparatus other than the shock absorbers 7 and 10 is the external world perception system (the external world perception apparatus 41) capable of perceiving external world information of the vehicle 1. The external world perception apparatus 41 forming the external world perception system includes an external world perception sensor. The external world perception sensor is a sensor of the external world perception apparatus 41 that perceives the state surrounding the vehicle 1. In other words, the external world perception sensor is a sensor that measures the position of an object existing around the vehicle 1. The external world perception sensor can be embodied by a camera such as a stereo camera and a single camera (for example, a digital camera), and/or a radar such as a laser radar, an infrared radar, and a millimeter-wave radar (for example, a light emitting element such as a semiconductor radar and a light receiving element that receives it). The external world perception sensor is not limited to the camera and the radar, and can be realized using various kinds of sensors (a detection device, a measurement device, and a radio wave detector) capable of perceiving (detecting) a state of the external world located on the vicinity of the vehicle 1.

In the third embodiment, the external world perception system (the external world perception apparatus 41) acquires road surface displacement information as the external world information of the vehicle 1. More specifically, in the third embodiment, the suspension system uses the sensor information of the external world perception system (the external world perception apparatus 41), which corresponds to the in-vehicle system other than the system for controlling the vehicle 1, i.e., the sensor information of the external world perception sensor such as a camera, a radar, a lidar to control the shock absorbers 7 and 10. In this case, the road surface displacement information, which corresponds to the external world information of the external world perception sensor, is used as the observed value in the estimation of the state of the vehicle 1.

As illustrated in FIG. 4, the external world perception apparatus 41 is connected to the CAN 16, which serves as the in-vehicle LAN. The external world information (the road surface displacement information), which corresponds to the sensor information of the external world perception apparatus 41, is output to the controller 21 via the CAN 16. In this case, the external world information (the road surface displacement information) is input to the vehicle body state estimation portion 22 (more specifically, the vertical motion estimation portion 22C) of the controller 21. The vehicle body state estimation portion 22 of the controller 21 includes a rotational motion calculation portion 42 in addition to the vertical fluctuation-induced wheel speed extraction portion 22A, the correction value estimation portion 22B, and the vertical motion estimation portion 22C.

The vehicle body speed, the wheel speeds, the longitudinal acceleration, the lateral acceleration, and the steering angle are input to the rotational motion calculation portion 42 via the CAN 16. The rotational motion calculation portion 42 estimates a rotational motion state amount similarly to a "rotational motion estimation unit 51" discussed in PTL 1. More specifically, the rotational motion calculation portion 42 calculates the pitch rate, which corresponds to the rotational angular velocity in the pitch direction of the vehicle 1, based on the motion equation, the filter, and the gain by receiving the vehicle body speed, the wheel speeds, the longitudinal acceleration, the lateral acceleration, and the steering angle as inputs, and outputs the calculated pitch rate to the vertical motion estimation portion 22C. The processing for calculating the pitch rate is discussed in various kinds of documents (documents regarding the estimation of the vehicle state) including published patent literatures such as PTL 1, and therefore further descriptions thereof will be omitted herein.

The pitch rate from the rotational motion calculation portion 42 and the road surface displacement from the external world perception sensor of the external world perception apparatus 41 are input to the vertical motion estimation portion 22C, in addition to the correction value and the vertical fluctuation-induced wheel speeds input from the correction value estimation portion 22B and the vertical fluctuation-induced wheel speed extraction portion 22A to the vertical motion estimation portion 22C, respectively. The vertical motion estimation portion 22C estimates the sprung speeds, the piston speeds, the piston displacements, the roll rate, and the pitch rate, which correspond to the state values of the vehicle 1, based on the correction value acquired as the input value, and the vertical fluctuation-induced wheel speeds, the pitch rate, and the road surface displacement acquired as the observed values.

In this manner, in the third embodiment, the vehicle 1 includes the external world perception system (the external world perception apparatus 41), which corresponds to the in-vehicle system other than the suspension system. Then, the road surface displacement information sensed by the external world perception sensor (for example, a camera or a lidar) of the external world perception system (the external world perception apparatus 41) is input to the controller 21 via the in-vehicle LAN communication such as the CAN 16 as additional sensed information. In the third embodiment, the accuracy of estimating the state of the vehicle 1 (the vehicle body 2) can be improved by inputting the correct road surface displacement information as the observed value. As a result, the accuracy of the signal input to the suspension control is improved, and therefore the performance of the suspension system can also be improved. The road surface displacement information is added as the observed value in the third embodiment, but the road surface displacement information may be added as the observed value in the first embodiment or the second embodiment.

The third embodiment is configured to estimate the state of the vehicle 1 using the sensor information (the road surface displacement) acquired by the external world perception apparatus 41 as described above, and a basic function thereof is not especially different from the function fulfilled by the above-described first embodiment. Especially, in the third embodiment, the external world perception system (the external world perception apparatus 41) is used as the in-vehicle apparatus other than the shock absorbers 7 and 10. Therefore, the information (the road surface displacement information) of the external world perception sensor of the external world perception system (the external world perception apparatus 41) can be used to estimate the state of the vehicle 1 as the observed value. In this case, the accuracy of estimating the state of the vehicle 1 can be improved by using the external world information acquired from the external world perception sensor, such as a camera, a radar, and a lidar.

Figure 5:
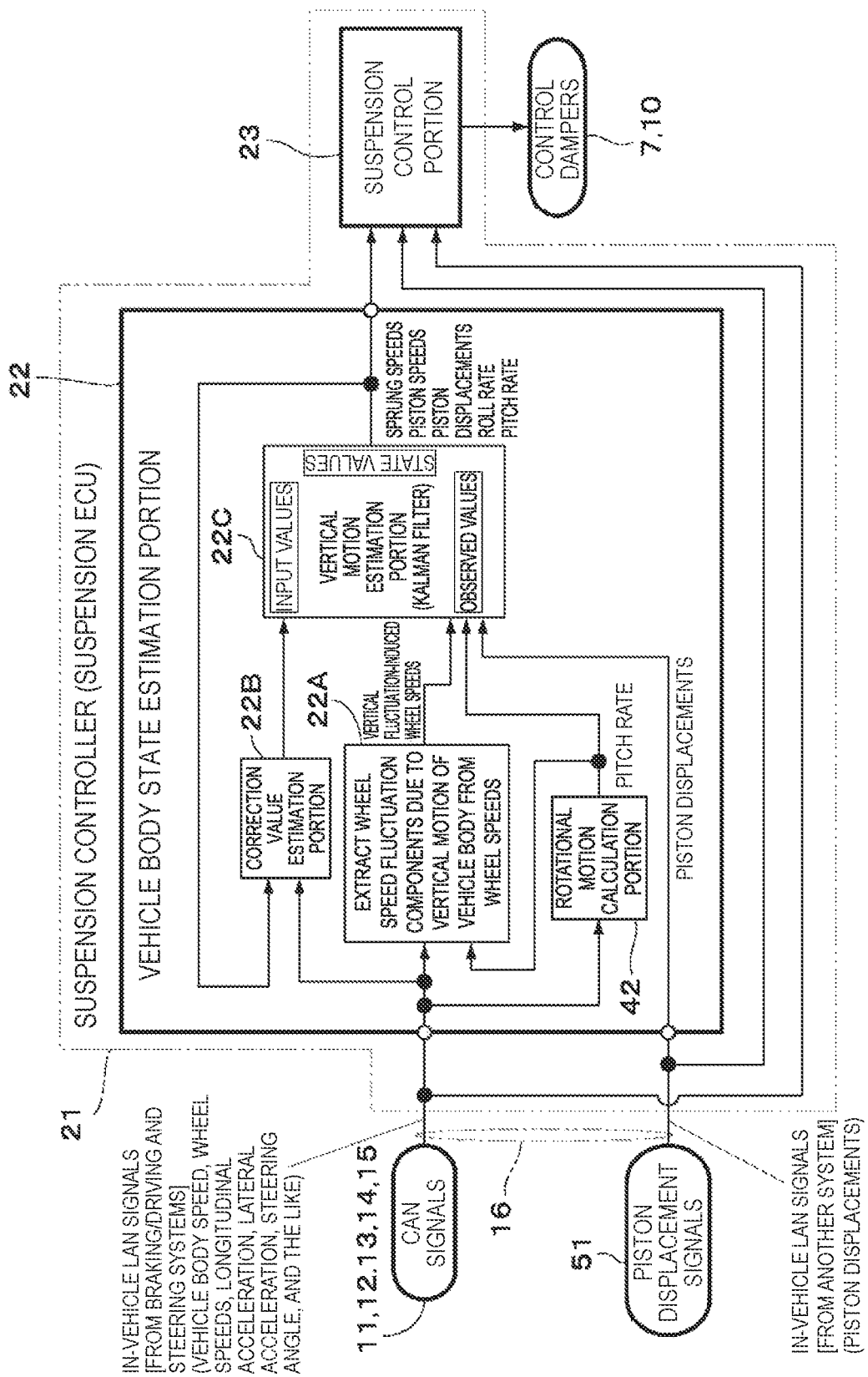
FIG. 5 is a block diagram illustrating a controller and the like according to a fourth embodiment.

Next, FIG. 5 illustrates a fourth embodiment. The fourth embodiment is characterized by being configured to use a headlight system as the in-vehicle apparatus other than the damping force variable shock absorber. The fourth embodiment will be described, identifying similar components to the above-described first embodiment and third embodiment by the same reference numerals and omitting descriptions thereof.

In the fourth embodiment, information of a vehicle height sensor 51 of a headlight system (a headlight apparatus) mounted on the vehicle 1 is used. In other words, in the fourth embodiment, the sensor of the in-vehicle apparatus other than the apparatus dedicated to the shock absorbers 7 and 10 is the vehicle height sensor 51 capable of detecting the vehicle height of the vehicle body 2. In this case, the vehicle height sensor 51 is the vehicle height sensor of the headlight system of the vehicle 1, which corresponds to the in-vehicle apparatus other than the apparatus dedicated to the shock absorbers 7 and 10. The headlight system also called a headlight auto-leveling system keeps the optical axis of the headlight appropriate regardless of a change in the vehicle height by automatically changing the angle of the headlight according to the vehicle height of the vehicle 1. In the fourth embodiment, the suspension system uses sensor information of the headlight system, which corresponds to the in-vehicle system other than the system for controlling the vehicle 1, i.e., the information of the vehicle height sensor 51 of the headlight system to control the shock absorbers 7 and 10.

The information of the vehicle height sensor 51 of the headlight system is input to the controller 21 as, for example, displacements of the shock absorbers 7 and 10 (the piston displacements). In other words, in the fourth embodiment, the piston displacements detected by the vehicle height sensor 51 are used as the observed values in the estimation of the state of the vehicle 1. As illustrated in FIG. 5, the vehicle height sensor 51 is connected to the CAN 16, which serves as the in-vehicle LAN. The piston displacements detected by the vehicle height sensor 51 are output to the controller 21 via the CAN 16. In this case, the displacements detected by the vehicle height sensor 51 are input to the vehicle body state estimation portion 22 (more specifically, the vertical motion estimation portion 22C) of the controller 21 and the suspension control portion 23 of the controller 21.

In this manner, in the fourth embodiment, the vehicle 1 includes the headlight system (the vehicle height sensor 51), which is the in-vehicle system other than the suspension system. Then, the piston displacement information sensed by the headlight system (the vehicle height sensor 51) is input to the controller 21 via the in-vehicle LAN communication such as the CAN 16 as additional sensed information. In the fourth embodiment, the accuracy of estimating the state of the vehicle 1 (the vehicle body 2) can be improved by inputting the accurate piston displacements as the observed values. Further, the estimated piston displacements have an advantage that noise can be removed therefrom, and the directly sensed piston displacements have an advantage that the accuracy thereof is high. Using them according to the intended use can improve the performance of the suspension system. The piston displacement information is added as the observed values in the fourth embodiment, but the piston displacement information may be added as the observed values in the first embodiment to the third embodiment.

The fourth embodiment is configured to estimate the state of the vehicle 1 using the information (the piston displacements) of the vehicle height sensor 51 of the headlight system as described above, and a basic function thereof is not especially different from the functions fulfilled by the above-described first embodiment to third embodiment. Especially, in the fourth embodiment, the vehicle height sensor 51 of the headlight system is used as the in-vehicle apparatus other than the shock absorbers 7 and 10. Therefore, the information (the piston displacement information) of the vehicle height sensor 51 of the system (the headlight system) other than the shock absorbers 7 and 10 can be used to estimate the state of the vehicle 1 as the observed values, and the accuracy of estimating the state of the vehicle 1 can be improved.

Figure 6:
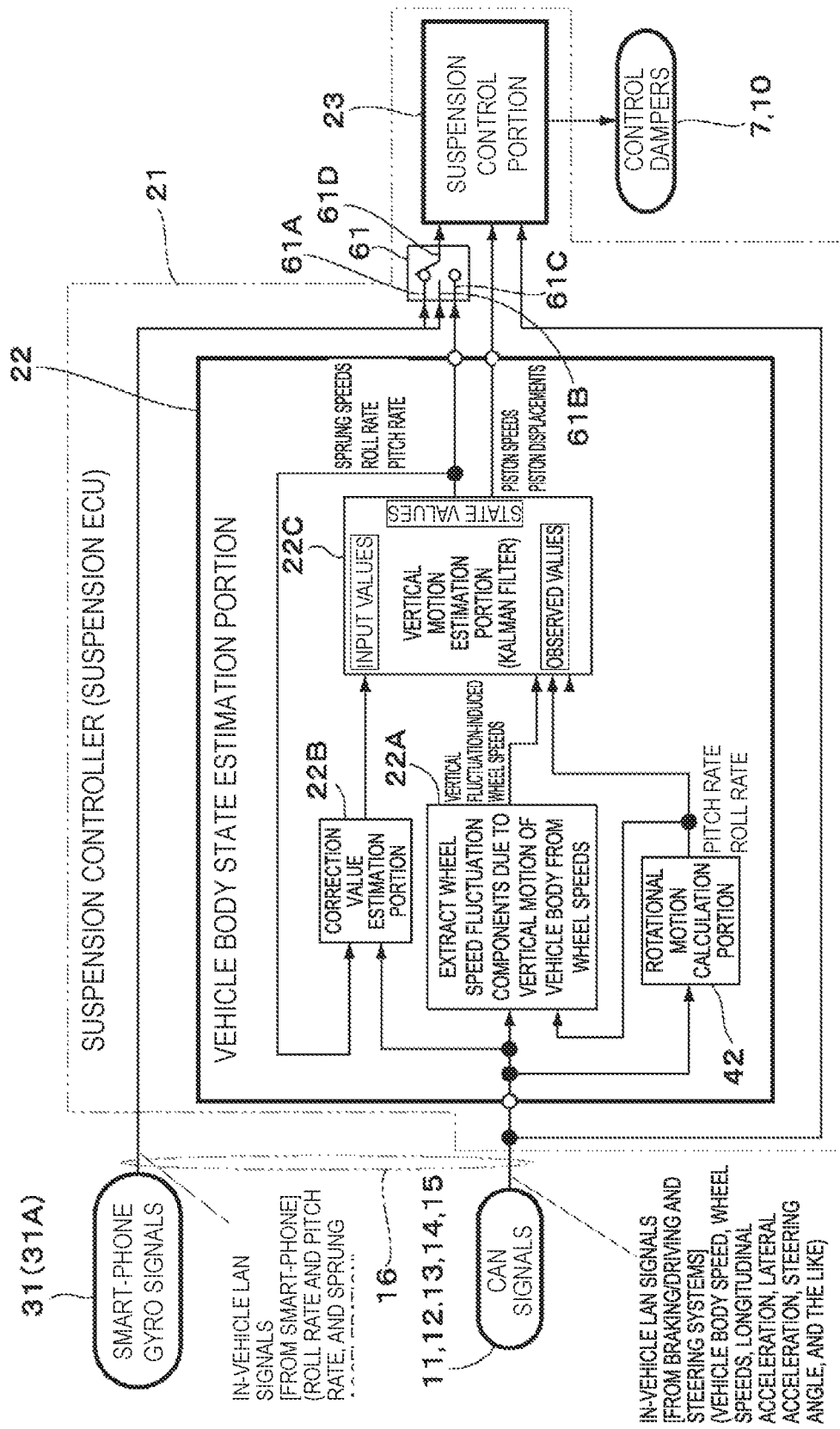
FIG. 6 is a block diagram illustrating a controller and the like according to a fifth embodiment.

Next, FIG. 6 illustrates a fifth embodiment. The fifth embodiment is characterized by being configured to use the sensor information of the mobile apparatus to control the damping force variable shock absorber. The fifth embodiment will be described, identifying similar components to the above-described first to fourth embodiments by the same reference numerals and omitting descriptions thereof.

In the fifth embodiment, the sensor information of the mobile system (the smartphone 31), which corresponds to the in-vehicle system other than the system for controlling the vehicle is used to control the shock absorbers 7 and 10. In this case, the controller 21 includes a mobile apparatus detection portion 61 that detects the smartphone 31, which is the mobile apparatus brought in the vehicle. The mobile apparatus detection portion 61 is configured as a switch including three input terminals 61A, 61B, and 61C, and one output terminal 61D. The first input terminal 61A and the second input terminal 61B of the mobile apparatus detection portion 61 are connected to the output side of the smartphone 31.

The first input terminal 61A is connected to the output terminal 61D when the shock absorbers 7 and 10 are controlled using the sensor information of the smartphone 31, i.e., the sprung acceleration, the roll rate, and the pitch rate detected by the smartphone 31. The second input terminal 61B is switched when it is detected whether there is a signal of the smartphone 31. The third input terminal 61C is connected to the output side of the vehicle body state estimation portion 22 (the vertical motion estimation portion 22C). The third input terminal 61C is connected to the output terminal 61D when the sensor information of the smartphone 31 cannot be used, i.e., the shock absorbers 7 and 10 are controlled using the sprung speeds, the roll rate, and the pitch rate estimated by the vehicle body state estimation portion 22.

In the fifth embodiment, the output side of the vertical motion estimation portion 22C is connected to the mobile apparatus detection portion 61 and the suspension control portion 23. The sprung speeds, the roll rate, and the pitch rate estimated by the vertical motion estimation portion 22C are output to the mobile apparatus detection portion 61. The sprung speeds and the piston displacements estimated by the vertical motion estimation portion 22C are output to the suspension control portion 23 without being output via the mobile apparatus detection portion 61.

The mobile apparatus detection portion 61 can detect whether the sensor information of the smartphone 31 brought in the vehicle 1 can be used, and switch the terminal according to a result of this detection. When the smartphone 31 is detected, the mobile apparatus detection portion 61 connects the first input terminal 61A and the output terminal 61D. When the smartphone 31 is not detected, the mobile apparatus detection portion 61 connects the third input terminal 61C and the output terminal 61D.

In this manner, the mobile apparatus detection portion 61 switches the terminal according to whether the smartphone 31 is detected. According thereto, when the smartphone 31 is detected by the mobile apparatus detection portion 61, the controller 21 identifies the rotational angular velocity in the roll direction and the rotational angular velocity in the pitch direction of the vehicle 1 based on the information of the gyro sensor 31A of the smartphone 31 as the rotational motion of the vehicle 1 (the roll rate and the pitch rate), and outputs the control signals to the shock absorbers 7 and 10 according to the estimated state of the vehicle (the piston speeds and the piston displacements), the rotational motion of the vehicle (the roll rate and the pitch rate), and the sprung acceleration of the acceleration sensor 31B. On the other hand, when the smartphone 31 is not detected by the mobile apparatus detection portion 61, the controller 21 outputs the control signals to the shock absorbers 7 and 10 according to the state of the vehicle 1 (the piston speeds, the piston displacements, the sprung speeds, the roll rate, and the pitch rate) estimated by the vehicle body state estimation portion 22.

In this manner, in the fifth embodiment, the sprung vertical acceleration information, the roll rate information, and the pitch rate information acquired by the smartphone 31 are used as additional sensed information. In the above-described second embodiment, the accuracy of estimating the state of the vehicle 1 (the vehicle body 2) is improved by using the information sensed by the smartphone 31 as the observed values. On the other hand, in the fifth embodiment, the conventional technique for estimating the state is used to estimate the state of the vehicle 1 (the vehicle body 2). In other words, the information sensed by the smartphone 31 is not used to estimate the state of the vehicle 1 (the vehicle body 2). In the fifth embodiment, when the information sensed by the smartphone 31 (the sprung acceleration, the roll rate, and the pitch rate) can be acquired, this information sensed by the smartphone 31 is used. On the other hand, when the information sensed by the smartphone 31 cannot be acquired due to a disconnection or a failure of the smartphone 31, the estimated values are used. Further, the estimated values are used for the piston speeds and the piston displacements while the values calculated based on the sensed values or the directly sensed values are used for the sprung speeds, the roll rate, and the pitch rate, and therefore the performance of the suspension system can be improved.

The fifth embodiment is configured to select whether to use the information sensed by the smartphone 31 by the mobile apparatus detection portion 61 as described above, and a basic function thereof is not especially different from the functions fulfilled by the above-described first to fourth embodiments. Especially, in the fifth embodiment, the sprung vertical acceleration information, the roll rate, and the pitch rate information can be used as the information sensed by the smartphone 31. Then, the shock absorbers 7 and 10 can be controlled using the information of the smartphone 31 when the information sensed by the smartphone 31 (the sprung acceleration, the roll rate, and the pitch rate) can be acquired, and can be controlled without use of the information of the smartphone 31 when the information sensed by the smartphone 31 cannot be acquired due to a disconnection or a failure of the smartphone 31. Therefore, the shock absorbers 7 and 10 can be controlled appropriately according to whether the information of the smartphone 31 is available.

The fifth embodiment and the above-described second embodiment have been described citing the smartphone 31 as an example of the mobile apparatus. However, the mobile apparatus is not limited thereto, and various kinds of mobile information terminals, such as a mobile phone (a feature phone), a tablet terminal, and a tablet PC, can be used as the mobile apparatus. Further, the fifth embodiment and the above-described second embodiment have been described citing the gyro sensor 31A and the acceleration sensor 31B as an example of the sensor of the mobile apparatus. However, the sensor of the mobile apparatus is not limited thereto, and various kinds of sensors (various kinds of sensors that detect a motion) other than the acceleration sensor or the gyro sensor mounted on the mobile apparatus, such as a geomagnetic sensor, may be used as the sensor of the mobile apparatus. Further, the vehicle 1 may use only any one of the acceleration sensor or the gyro sensor.

The first embodiment and the second embodiment have been described citing the example in which the vehicle 1 is configured to use the roll rate and the pitch rate as the information of the gyro sensor 17A or 31A. However, without being limited thereto, the vehicle 1 may be configured to use one of the roll rate or the pitch rate. In other words, at least any of the roll rate, the pitch rate, or the yaw rate, more specifically, at least one of the roll rate or the pitch rate can be used as the gyro information. Further, each of the embodiments is only an example, and it is apparent that the configurations indicated in the different embodiments can be partially replaced or combined.

Possible configurations as the vehicle control apparatus and the suspension system based on the above-described embodiments include the following examples.

As a first configuration, a vehicle control apparatus estimates a state of a vehicle based on a wheel speed sensor mounted on the vehicle and outputs a control signal to a damping force variable shock absorber provided between a wheel and a vehicle body according to the estimated state of the vehicle. The vehicle control apparatus uses information of a sensor of an in-vehicle apparatus other than an apparatus dedicated to the damping force variable shock absorber to estimate the state of the vehicle as an observed value.

According to this first configuration, since the information of the sensor of the in-vehicle apparatus other than the apparatus dedicated to the damping force variable shock absorber is used to estimate the state of the vehicle as the observed value, the accuracy of estimating the state of the vehicle can be improved. In other words, even in a sensor-less configuration not including a sensor dedicated to the damping force variable shock absorber, the information of the sensor (for example, the gyro sensor and the acceleration sensor) of the in-vehicle apparatus (for example, the navigation system and the smartphone) can be used to estimate the vehicle state (for example, the vertical motion of the vehicle body, the vehicle speed, the braking/driving state, and the wheel slip) as the observed value. As a result, the accuracy of estimating the vehicle state can be improved and the vibration damping performance by the damping force variable shock absorber can be enhanced. In other words, the accurate value acquired from the sensing can be used instead of the estimated value as the observed value in the estimation of the vehicle state, and the estimation accuracy can be improved.

As a second configuration, in the first configuration, the information of the sensor of the in-vehicle apparatus is gyro information of a gyro sensor mounted on the in-vehicle apparatus. According to this second configuration, the gyro information of the gyro sensor of the in-vehicle apparatus can be used to estimate the state of the vehicle as the observed value.

As a third configuration, in the second configuration, the vehicle control apparatus identifies at least one of a rotational angular velocity in a roll direction or a rotational angular velocity in a pitch direction of the vehicle based on the information of the gyro sensor as a rotational motion of the vehicle, and estimates the state of the vehicle based on the identified rotational motion of the vehicle and running state information of the vehicle. According to this third configuration, the state of the vehicle can be estimated based on the rotational motion of the vehicle (for example, the roll rate and the pitch rate) identified based on the information of the gyro sensor and the running state information of the vehicle (for example, the wheel speed acquired from the wheel speed sensor and the CAN information such as the vehicle body speed). The gyro sensor can measure the correct roll rate and pitch rate free of influence from the installation angle of the in-vehicle apparatus. Therefore, the accuracy of estimating the sprung speed, the piston speed, and the like can be improved by using at least one of the correct roll rate or pitch rate acquired from the in-vehicle apparatus as the observed value.

As a fourth configuration, in the third configuration, the vehicle control apparatus outputs the control signal to the damping force variable shock absorber according to the estimated state of the vehicle and the rotational motion of the vehicle. According to this fourth configuration, the rotational motion of the vehicle identified based on the information of the gyro sensor is also used to output the control signal in addition to being used to estimate the state of the vehicle. As a result, the control signal can be output using the correct roll rate and pitch rate, and the control performance can be improved.

As a fifth configuration, in the third configuration, the running state information of the vehicle includes at least wheel speed information. The vehicle control apparatus identifies a vertical motion of the vehicle based on the wheel speed information, and estimates the state of the vehicle based on the vertical motion of the vehicle and the rotational motion of the vehicle. According to this fifth configuration, the state of the vehicle can be estimated based on the rotational motion of the vehicle (for example, the roll rate and the pitch rate) identified based on the information of the gyro sensor and the running state information of the vehicle including the wheel speed information.

As a sixth configuration, in the fifth configuration, the vehicle control apparatus identifies the vertical motion of the vehicle based on the wheel speed information and the rotational motion of the vehicle, and estimates the state of the vehicle based on the vertical motion of the vehicle and the rotational motion of the vehicle. According to this sixth configuration, the state of the vehicle can be estimated based on the vertical motion of the vehicle and the rotational motion of the vehicle.

As a seventh configuration, in the second configuration, the vehicle control apparatus identifies at least one of a rotational angular speed in a roll direction or a rotational angular speed in a pitch direction of the vehicle based on the information of the gyro sensor as a rotational motion of the vehicle, and further identifies a sprung vertical acceleration of the vehicle based on an acceleration sensor mounted on the in-vehicle apparatus other than the apparatus dedicated to the damping force variable shock absorber. The vehicle control apparatus estimates the state of the vehicle based on the rotational motion of the vehicle, the spring vertical acceleration, and the running state information of the vehicle.

According to this seventh configuration, the state of the vehicle can be estimated by also using the acceleration sensor mounted on the in-vehicle apparatus. In other words, the sensor value of the acceleration sensor (the sprung acceleration) can be used as the observed value in addition to the information of the gyro sensor. Due to that, the estimation accuracy of estimating the state can be improved, and a further correct roll rate, pitch rate, and sprung acceleration (and/or sprung speed) can be used in the control. As a result, the control performance can also be improved from this viewpoint. Further, the estimation accuracy of estimating the state can also be improved by removing the gravitational component identified based on the sensor value of the acceleration sensor from the rotational motion of the vehicle (for example, the roll rate and the pitch rate) identified based on the information of the gyro sensor.

As an eighth configuration, in the first configuration, the in-vehicle apparatus other than the apparatus dedicated to the damping force variable shock absorber is a navigation system. According to this eighth configuration, the information of the sensor of the navigation system can be used to estimate the state of the vehicle as the observed value. In this case, the navigation system includes the gyro sensor and is also mounted on the vehicle at the fixed position, and therefore the accuracy of estimating the state of the vehicle can be improved.

As a ninth configuration, in the first configuration, the in-vehicle apparatus other than the apparatus dedicated to the damping force variable shock absorber is a mobile apparatus brought in the vehicle. According to this ninth configuration, the information of the sensor of the mobile apparatus such as a smartphone and a tablet can be used to estimate the state of the vehicle as the observed value. In this case, the mobile apparatus includes the gyro sensor and/or the acceleration sensor, and the accuracy of estimating the state of the vehicle can be improved by using these pieces of sensor information.

As a tenth configuration, in the first configuration, the in-vehicle apparatus other than the apparatus dedicated to the damping force variable shock absorber is an external world perception system capable of perceiving external world information around the vehicle. According to this tenth configuration, the information of the sensor (the external world perception sensor) of the external world perception system can be used to estimate the state of the vehicle as the observed value. In this case, the accuracy of estimating the state of the vehicle can be improved by using the external world information acquired from the external world perception sensor, such as a camera, a radar, and a lidar.

As an eleventh configuration, in the tenth configuration, the external world information around the vehicle is road surface displacement information. According to this eleventh configuration, the accuracy can be improved by using the road surface displacement information to estimate the state of the vehicle.

As a twelfth configuration, in the first configuration, the sensor of the in-vehicle apparatus other than the apparatus dedicated to the damping force variable shock absorber is a vehicle height sensor capable of detecting a vehicle height of the vehicle body. According to this twelfth configuration, the information of the vehicle height sensor of the in-vehicle apparatus other than the apparatus dedicated to the damping force variable shock absorber can be used to estimate the state of the vehicle as the observed value.

As a thirteenth configuration, in the twelfth configuration, the vehicle height sensor is a vehicle height sensor of a headlight system of the vehicle. According to this thirteenth configuration, the information of the vehicle height sensor of the headlight system, which corresponds to the in-vehicle apparatus other than the apparatus dedicated to the damping force variable shock absorber, can be used to estimate the state of the vehicle as the observed value.

As a fourteenth configuration, a suspension system includes a damping force variable shock absorber provided between a wheel and a vehicle body of a vehicle, a vehicle control apparatus configured to output a control signal to the damping force variable shock absorber, and a wheel speed sensor mounted on the vehicle. The suspension system estimates a state of the vehicle based on wheel speed information of the wheel speed sensor and controls a damping force of the damping force variable shock absorber according to the estimated state of the vehicle. The suspension system uses sensor information of an in-vehicle system other than a system for controlling the vehicle to control the damping force variable shock absorber.

According to this fourteenth configuration, the sensor information of the in-vehicle system other than the system for controlling the vehicle (for example, the sensor information other than the sensor regarding the control of the behavior of the vehicle, such as the wheel speed sensor, the steering angle sensor, and the brake sensor, and the sensor information of the navigation system, the mobile apparatus, the headlight system, the eternal world perception system, or the like) can be used to control the damping force variable shock absorber. As a result, the accuracy of estimating the vehicle state and thus the vibration damping performance by the damping force variable shock absorber can be improved. In other words, even in a sensor-less configuration not including a sensor dedicated to the damping force variable shock absorber, the damping force variable shock absorber can be controlled using the information of the sensor (for example, the gyro sensor, the vehicle height sensor, the distance sensor, the camera, and the radar) of the navigation system, the smartphone, the tablet, the headlight system, the external world perception system, or the like. As a result, the accuracy of estimating the vehicle state and thus the vibration damping performance by the damping force variable shock absorber can be improved. In other words, the control performance can be improved by using the accurate sensed value instead of the estimated value for the control.

As a fifteenth configuration, in the fourteenth configuration, the suspension system uses the sensor information of the in-vehicle system other than the system for controlling the vehicle as an observed value in the estimation of the state of the vehicle. According to this fifteenth configuration, the information of the sensor (for example, the gyro sensor, the vehicle height sensor, the distance sensor, the camera, or the radar) of the navigation system, the smartphone, the tablet, the headlight system, the external world perception system or the like can be used to estimate the vehicle state (for example, the vertical motion of the vehicle body, the vehicle speed, the braking/driving state, and the wheel slip) as the observed value. As a result, the accuracy of estimating the vehicle state can be improved and the vibration damping performance by the damping force variable shock absorber can be enhanced.

As a sixteenth configuration, in the fourteenth configuration, the vehicle control apparatus includes a mobile apparatus detection portion configured to detect a mobile apparatus brought in the vehicle. In a case where the mobile apparatus is detected by the mobile apparatus detection portion, the vehicle control apparatus identifies at least one of a rotational angular speed in a roll direction or a rotational angular speed in a pitch direction of the vehicle based on information of a gyro sensor of the mobile apparatus as a rotational motion of the vehicle, and outputs the control signal to the damping force variable shock absorber according to the estimated state of the vehicle and the rotational motion of the vehicle. In a case where the mobile apparatus is not detected by the mobile apparatus detection portion, the vehicle control apparatus outputs the control signal to the damping force variable shock absorber according to the estimated state of the vehicle.

According to this sixteenth configuration, for example, the information indicating the sprung vertical acceleration, the roll rate, and the pitch rate can be used as the sensor information of the mobile apparatus such as a smartphone. Then, the damping force variable shock absorber can be controlled using the information of the mobile apparatus when the information sensed by the mobile apparatus (for example, the sprung acceleration, the roll rate, and the pitch rate) can be acquired, and can be controlled without use of the information of the mobile apparatus when the information sensed by the mobile apparatus cannot be acquired due to a disconnection or a failure of the mobile apparatus. As a result, the damping force variable shock absorber can be controlled appropriately according to whether the information of the mobile apparatus is available.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2020-117710 filed on Jul. 8, 2020. The entire disclosure of Japanese Patent Application No. 2020-117710 filed on Jul. 8, 2020 including the specification, the claims, the drawings, and the abstract is incorporated herein by reference in its entirety.

REFERENCE SIGNS LIST 1 vehicle
2 vehicle body
3 front wheel (wheel)
4 rear wheel (wheel)
7, 10 shock absorber (damping force variable shock absorber)
12 wheel speed sensor
17 navigation apparatus (navigation system or in-vehicle apparatus other than an apparatus dedicated to the damping force variable shock absorber)
17A gyro sensor (sensor of the in-vehicle apparatus other than the apparatus dedicated to the damping force variable shock absorber)
21 controller (vehicle control apparatus)
22 vehicle body state estimation portion
23 suspension control portion
31 smartphone (mobile apparatus or in-vehicle apparatus other than the apparatus dedicated to the damping force variable shock absorber)
31A gyro sensor (sensor of the in-vehicle apparatus other than the apparatus dedicated to the damping force variable shock absorber)
31B acceleration sensor (sensor of the in-vehicle apparatus other than the apparatus dedicated to the damping force variable shock absorber)
41 external world perception apparatus (external world perception system or in-vehicle apparatus other than the apparatus dedicated to the damping force variable shock absorber)
51 vehicle height sensor (sensor of the in-vehicle apparatus other than the apparatus dedicated to the damping force variable shock absorber)
61 mobile apparatus detection portion

The invention claimed is:

1. A vehicle control apparatus, wherein the vehicle control apparatus estimates a state of a vehicle based on a wheel speed sensor mounted on the vehicle using a Kalman filter and outputs a control signal to a damping force variable shock absorber provided between a wheel and a vehicle body according to the estimated state of the vehicle, and wherein the vehicle control apparatus uses information of a sensor of an in-vehicle apparatus other than an apparatus dedicated to the damping force variable shock absorber to estimate the state of the vehicle as an observed value of the Kalman filter, wherein the information of the sensor of the in-vehicle apparatus is gyro information of a gyro sensor mounted on the in-vehicle apparatus, wherein the vehicle control apparatus identifies at least one of a rotational angular speed in a roll direction or a rotational angular speed in a pitch direction of the vehicle based on the information of the gyro sensor as a rotational motion of the vehicle, and further identifies a sprung vertical acceleration of the vehicle based on an acceleration sensor mounted on the in-vehicle apparatus other than the apparatus dedicated to the damping force variable shock absorber, and wherein the vehicle control apparatus estimates the state of the vehicle based on the rotational motion of the vehicle, the spring vertical acceleration, and the running state information of the vehicle.

2. The vehicle control apparatus according to claim 1, wherein the vehicle control apparatus identifies at least one of a rotational angular velocity in a roll direction or a rotational angular velocity in a pitch direction of the vehicle based on the information of the gyro sensor as a rotational motion of the vehicle, and estimates the state of the vehicle based on the identified rotational motion of the vehicle and running state information of the vehicle.

3. The vehicle control apparatus according to claim 2, wherein the vehicle control apparatus outputs the control signal to the damping force variable shock absorber according to the estimated state of the vehicle and the rotational motion of the vehicle.

4. The vehicle control apparatus according to claim 2, wherein the running state information of the vehicle includes at least wheel speed information, and wherein the vehicle control apparatus identifies a vertical motion of the vehicle based on the wheel speed information, and estimates the state of the vehicle based on the vertical motion of the vehicle and the rotational motion of the vehicle.

5. The vehicle control apparatus according to claim 4, wherein the vehicle control apparatus identifies the vertical motion of the vehicle based on the wheel speed information and the rotational motion of the vehicle, and estimates the state of the vehicle based on the vertical motion of the vehicle and the rotational motion of the vehicle.

6. The vehicle control apparatus according to claim 1, wherein the in-vehicle apparatus other than the apparatus dedicated to the damping force variable shock absorber is a navigation system.

7. The vehicle control apparatus according to claim 1, wherein the in-vehicle apparatus other than the apparatus dedicated to the damping force variable shock absorber is a mobile apparatus brought in the vehicle.

8. The vehicle control apparatus according to claim 1, wherein the in-vehicle apparatus other than the apparatus dedicated to the damping force variable shock absorber is an external world perception system capable of perceiving external world information around the vehicle.

9. The vehicle control apparatus according to claim 8, wherein the external world information around the vehicle is road surface displacement information.

10. The vehicle control apparatus according to claim 1, wherein the sensor of the in-vehicle apparatus other than the apparatus dedicated to the damping force variable shock absorber is a vehicle height sensor capable of detecting a vehicle height of the vehicle body.

11. The vehicle control apparatus according to claim 10, wherein the vehicle height sensor is a vehicle height sensor of a headlight system of the vehicle.

12. A suspension system comprising:
a damping force variable shock absorber provided between a wheel and a vehicle body of a vehicle;
a vehicle control apparatus configured to output a control signal to the damping force variable shock absorber; and
a wheel speed sensor mounted on the vehicle,
wherein the suspension system estimates a state of the vehicle based on wheel speed information of the wheel speed sensor using a Kalman filter and controls a damping force of the damping force variable shock absorber according to the estimated state of the vehicle, and
wherein the suspension system uses sensor information of an in-vehicle system other than a system for controlling the vehicle to control the damping force variable shock absorber as an observed value of the Kalman filter,
wherein the vehicle control apparatus includes a mobile apparatus detection portion configured to detect a mobile apparatus brought in the vehicle,
wherein, in a case where the mobile apparatus is detected by the mobile apparatus detection portion, the vehicle control apparatus identifies at least one of a rotational angular speed in a roll direction or a rotational angular speed in a pitch direction of the vehicle based on information of a gyro sensor of the mobile apparatus as a rotational motion of the vehicle, and outputs the control signal to the damping force variable shock absorber according to the estimated state of the vehicle and the rotational motion of the vehicle, and
wherein, in a case where the mobile apparatus is not detected by the mobile apparatus detection portion, the vehicle control apparatus outputs the control signal to the damping force variable shock absorber according to the estimated state of the vehicle.

13. The suspension system according to claim 12, wherein the suspension system uses the sensor information of the in-vehicle system other than the system for controlling the vehicle as an observed value in the estimation of the state of the vehicle.

* * * * *